(12) United States Patent
Li et al.

(10) Patent No.: US 12,689,717 B2
(45) Date of Patent: Jul. 21, 2026

(54) METHOD FOR PROCESSING INPUT IMAGE, GENERATING RENDERED IMAGE BY RENDERING THE INPUT IMAGE BASED ON LIGHT SOURCE COLOR INFORMATION AND PANORAMIC IMAGE

(71) Applicant: Samsung Electronics Co., Ltd., Suwon-si (KR)

(72) Inventors: Weiming Li, Suwon-si (KR); Inwoo Ha, Suwon-si (KR); Qiang Wang, Suwon-si (KR); Young Hun Sung, Suwon-si (KR); Hao Wang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 18/524,153

(22) Filed: Nov. 30, 2023

(65) Prior Publication Data

US 2024/0187559 A1 Jun. 6, 2024

(30) Foreign Application Priority Data

Dec. 1, 2022 (CN) .......................... 202211535932.7
Nov. 8, 2023 (KR) ......................... 10-2023-0153731

(51) Int. Cl.
*H04N 9/73* (2023.01)
*G06T 5/50* (2006.01)
(Continued)

(52) U.S. Cl.
CPC ................. *H04N 9/73* (2013.01); *G06T 5/50* (2013.01); *G06T 7/11* (2017.01); *G06T 7/90* (2017.01); *G06T 9/00* (2013.01); *G06V 10/42*

(2022.01); *G06V 10/60* (2022.01); *G06T 2207/20208* (2013.01); *G06T 2207/20221* (2013.01); *G06V 20/05* (2022.01)

(58) Field of Classification Search
None
See application file for complete search history.

(56) References Cited

U.S. PATENT DOCUMENTS 7,436,997 B2 * 10/2008 Ishigami ................ H04N 23/88
382/167
10,665,011 B1 5/2020 Sunkavalli et al.
(Continued)

FOREIGN PATENT DOCUMENTS

KR 10-2022-0089836 A 6/2022

OTHER PUBLICATIONS

Somanath, Gowri, and Daniel Kurz. "HDR environment map estimation for real-time augmented reality." *Proceedings of the IEEE/CVF Conference on Computer Vision and Pattern Recognition.* 2021.
(Continued)

*Primary Examiner* — Haris Sabah
(74) *Attorney, Agent, or Firm* — NSIP Law

(57) ABSTRACT

A processor-implemented method includes obtaining an input image, predicting light source color information of a scene corresponding to the input image and a panoramic image corresponding to the input image using an image processing model, and generating a rendered image by rendering the input image based on either one or both of the light source color information and the panoramic image.

20 Claims, 16 Drawing Sheets

(51) Int. Cl.

| | |
|---|---|
| *G06T 7/11* | (2017.01) |
| *G06T 7/90* | (2017.01) |
| *G06T 9/00* | (2006.01) |
| *G06V 10/42* | (2022.01) |
| *G06V 10/60* | (2022.01) |
| G06V 20/05 | (2022.01) |

(56) References Cited

U.S. PATENT DOCUMENTS

| | | | |
|---|---|---|---|
| 10,713,816 B2 | 7/2020 | Hu et al. | |
| 2010/0007765 A1* | 1/2010 | Myhrvold | H04N 23/88 |
| | | | 348/E9.037 |
| 2014/0126815 A1* | 5/2014 | Ko | G06T 11/10 |
| | | | 382/167 |
| 2014/0334729 A1* | 11/2014 | Manabe | H04N 1/6077 |
| | | | 382/167 |
| 2018/0260975 A1* | 9/2018 | Sunkavalli | G06N 3/09 |
| 2019/0124749 A1* | 4/2019 | Deixler | G06T 7/73 |
| 2020/0074600 A1 | 3/2020 | Sunkavalli et al. | |
| 2021/0065440 A1 | 3/2021 | Sunkavalli et al. | |

OTHER PUBLICATIONS

Yu, Hanning, et al. "Luminance Attentive Networks for HDR Image and Panorama Reconstruction." Computer Graphics Forum. vol. 40. No. 7. 2021., (12 pages).

Wang, Guangcong, et al. "StyleLight: HDR Panorama Generation for Lighting Estimation and Editing." European Conference on Computer Vision. Cham: Springer Nature Switzerland, arXiv:2207. 148 11vl [cs.CV] Jul. 29, 2022., (22 pages).

Extended European search report issued on Jun. 14, 2024, in counterpart European Patent Application No. 23213638.2 (10 pages).

* cited by examiner

METHOD FOR PROCESSING INPUT IMAGE, GENERATING RENDERED IMAGE BY RENDERING THE INPUT IMAGE BASED ON LIGHT SOURCE COLOR INFORMATION AND PANORAMIC IMAGE

CROSS-REFERENCE TO RELATED APPLICATIONS

This application claims the benefit under 35 USC § 119(a) of Chinese Patent Application No. 202211535932.7 filed on Dec. 1, 2022, in the China National Intellectual Property Administration, and Korean Patent Application No. 10-2023-0153731 filed on Nov. 8, 2023, in the Korean Intellectual Property Office, the entire disclosures of which are incorporated herein by reference for all purposes.

BACKGROUND

1. Field

The following description relates to an apparatus and method with image processing.

2. Description of Related Art

Mixed reality (MR) may provide a user with real information experience by adding a virtual content to a real scene in front of the user. When a virtual content is merged with a real scene, the MR system should have high-precision real-time processing and understanding of lighting conditions of the real scene to exhibit a high-quality virtual reality merging effect in front of the user. However, when an apparatus does not predict a color of a light source when capturing a scene, a color deviation may occur between a rendered image provided in the MR system and a real scene image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes: obtaining an input image; predicting light source color information of a scene corresponding to the input image and a panoramic image corresponding to the input image using an image processing model; and generating a rendered image by rendering the input image based on either one or both of the light source color information and the panoramic image.

The predicting of the light source color information of the scene corresponding to the input image and the panoramic image corresponding to the input image using the image processing model may include: generating an encoded feature of the input image by encoding the input image using an encoding network of the image processing model; and predicting the light source color information and the panoramic image based on the encoded feature using a first prediction network of the image processing model.

The predicting of the light source color information of the scene corresponding to the input image and the panoramic image corresponding to the input image using the image processing model may include: generating an encoded feature of the input image by encoding the input image using an encoding network of the image processing model; predicting the light source color information based on the encoded feature using a second prediction network of the image processing model; and predicting the panoramic image by decoding the encoded feature using a decoding network of the image processing model.

The generating of the encoded feature of the input image by encoding the input image using the encoding network of the image processing model may include: obtaining a plurality of image blocks by dividing the input image; generating encoded features of the plurality of image blocks by encoding each of the plurality of image blocks; and generating an encoded feature of the input image based on the encoded features of the plurality of image blocks.

The generating of the encoded features of the plurality of image blocks by encoding each of the plurality of image blocks may include: generating an initial encoded feature of each image block by encoding each of the plurality of image blocks; and improving a feature of the initial encoded feature of each image block using a first attention network of the image processing model to generate the improved encoded feature of each image block as encoded features of the plurality of image blocks.

The predicting of the light source color information may include: for each image block, predicting light source color information of a scene corresponding to the image block based on the encoded feature of the image block, and determining a reliability of the image block; and obtaining the light source color information of the scene by pooling the light source color information corresponding to the image block based on the reliability of each image block.

The predicting of the panoramic image may include: obtaining a reliability of each image block; obtaining a high dynamic range (HDR) image corresponding to each image block by decoding each of the encoded feature of each image block; and generating the panoramic image by pooling the HDR image corresponding to the image block based on the reliability of each image block.

The generating of the encoded feature of the input image by encoding the input image using the encoding network of the image processing model may include: generating a global feature of the input image by encoding the input image using the encoding network; generating a lighting feature and a scene feature by decoupling features from the global feature using a decoupling network of the image processing model; and improving features of the lighting feature and the scene feature using a second attention network of the image processing model to generate a scene-based lighting feature as the encoded feature of the input image.

The generating of the rendered image by rendering the input image based on either one or both of the light source color information and the panoramic image may include: generating the rendered image by rendering the input image based on the input image, the panoramic image, and virtual object related information; and outputting the rendered image using a video see through (VST) device.

The generating of the rendered image by rendering the input image based on either one or both of the light source color information and the panoramic image may include: generating a panoramic image corresponding to a white light source by performing color correction on the panoramic image based on the light source color information using a white balance method; generating a first rendered image by rendering the input image based on the panoramic image of the white light source and virtual object related information;

generating actual light source color information of the scene by mapping the light source color information; generating a second rendered image by adjusting a color of the first rendered image using the actual light source color information; and outputting a target image formed by superposing the input image and the second rendered image using an optical see through (OST) device.

The target image may be formed by superposing the input image and a prime number of the second rendered images.

The method may include predicting camera parameters related to capturing of the input image using the image processing model.

The method may include: obtaining training data, wherein the training data may include a limited view image with a different field of view under a same scene, a first panoramic image, and first light source color information corresponding to when the limited view image and the first panoramic image are captured; predicting second light source color information of a scene corresponding to the limited view image and a second panoramic image corresponding to the limited view image using the image processing model; and training the image processing model by adjusting network parameters of the image processing model based on the first light source color information, the second light source color information, the first panoramic image, and the second panoramic image.

In one or more general aspects, an electronic device includes: one or more processors configured to: obtain an input image; predict light source color information of a scene corresponding to the input image and a panoramic image corresponding to the input image using an image processing model; and generate a rendered image by rendering the input image based on either one or both of the light source color information and the panoramic image.

For the predicting of the light source color information and the panoramic image, the one or more processors may be configured to: generate an encoded feature of the input image by encoding the input image using an encoding network of the image processing model; and predict the light source color information and the panoramic image based on the encoded feature using a first prediction network of the image processing model.

For the predicting of the light source color information and the panoramic image, the one or more processors may be configured to: generate an encoded feature of the input image by encoding the input image using an encoding network of the image processing model; predict the light source color information based on the encoded feature using a second prediction network of the image processing model; and predict the panoramic image by decoding the encoded feature using a decoding network of the image processing model.

For the generating of the rendered image, the one or more processors may be configured to: generate the rendered image by rendering the input image based on the input image, the panoramic image, and virtual object related information; and output the rendered image using a video see through (VST) device.

For the generating of the rendered image, the one or more processors may be configured to: generate a panoramic image corresponding to a white light source by performing color correction on the panoramic image based on the light source color information using a white balance method; generate a first rendered image by rendering the input image based on the panoramic image of the white light source and virtual object related information; generate actual light source color information of the scene by mapping the light source color information; generate a second rendered image by adjusting a color of the first rendered image using the actual light source color information; and output a target image formed by superposing the input image and the second rendered image using an optical see through (OST) device.

The one or more processors may be configured to: obtain training data comprising a limited view image with a different field of view under a same scene, a first panoramic image, and first light source color information corresponding to when the limited view image and the first panoramic image are captured; predict second light source color information of a scene corresponding to the limited view image and a second panoramic image corresponding to the limited view image using the image processing model; and train the image processing model by adjusting network parameters of the image processing model based on the first light source color information, the second light source color information, the first panoramic image, and the second panoramic image.

In one or more general aspects, a processor-implemented method includes: obtaining training data, wherein the training data may include a limited view image with a different field of view under a same scene, a first panoramic image, and first light source color information corresponding to when the limited view image and the first panoramic image are captured; predicting second light source color information of a scene corresponding to the limited view image and a second panoramic image corresponding to the limited view image using an image processing model; and training the image processing model by adjusting network parameters of the image processing model based on the first light source color information, the second light source color information, the first panoramic image, and the second panoramic image.

Other features and aspects will be apparent from the following detailed description, the drawings, and the claims.

Figure 1:
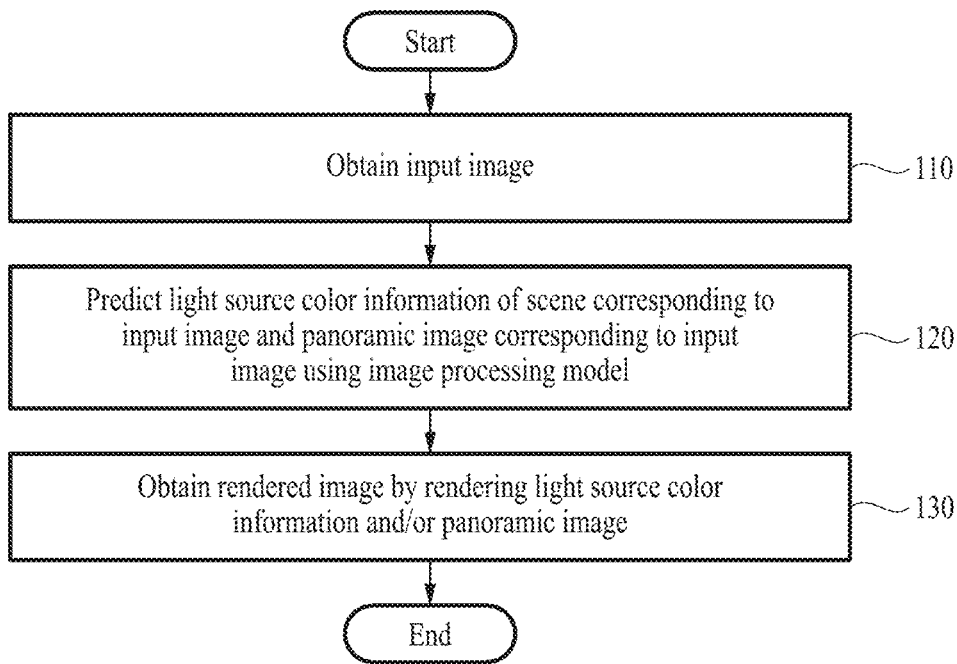
FIG. 1 illustrates an example of an image processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical and scientific terms used herein have the same meaning as commonly understood consistent with and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

When describing the examples with reference to the accompanying drawings, like reference numerals refer to like components and a repeated description related thereto will be omitted. In the description of examples, detailed description of well-known related structures or functions will be omitted when it is deemed that such description will cause ambiguous interpretation of the present disclosure.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The phrases "at least one of A, B, and C," "at least one of A, B, or C," and the like are intended to have disjunctive meanings, and these phrases "at least one of A, B, and C," "at least one of A, B, or C," and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The same name may be used to describe an element included in the examples described above and an element having a common function. Unless otherwise mentioned, the descriptions on the examples may be applicable to the following examples and thus, duplicated descriptions will be omitted for conciseness.

As a technology for predicting a high dynamic range (HDR) image, EnvMapNet is an autoencoder-based network that may estimate an HDR environment image in real time from an image of a camera with a limited field of view. The network proposes two types of losses for end-to-end training. A loss ProjectionLoss may be used for image generation, and a loss ClusterLoss may be used for adversarial training. In addition, based on this, a mobile application configured to execute a corresponding network model in 9 milliseconds on a mobile device and rendering a visually consistent virtual object in real time in a real environment may be implemented. However, the typical network model treats all image blocks equally and may only process indoor scenes. Accordingly, a method and apparatus of one or more embodiments includes an image block-based image processing model that may simultaneously process indoor and outdoor scenes by processing semantic clues of various parts of an image and paying attention to contributions of different parts, thereby providing a technological improvement over the typical network model.

To overcome a problem that direct compression of an outdoor panoramic image into low-dimensional hidden features causes interaction between an HDR intensity of the sun and a complex texture of the surrounding parts of the sky and lacks fine control, an apparatus and method may include a layered decoupled sky model (HDSky). When this model is used, an outdoor panoramic image may be hierarchically decomposed into several components based on three well-configured autoencoders. A first autoencoder may compress each clear panoramic image into a sky vector and a sun vector with some constraints. A second autoencoder and a third autoencoder may further separate a sun intensity and a sky intensity from the sun vector and the sky vector, and each may have several user-defined loss functions. In addition, an integrated framework may predict all-weather sky information from a single outdoor image. However, this method may only be applicable to lighting estimation of an outdoor scene. To solve the above technical problems, the method and apparatus of one or more embodiments may implement a network for solving the lighting estimation for several types of scenes by decoupling a hidden feature into a hidden feature representing lighting and a scene hidden feature processing indoor and outdoor scenes.

In addition, a training-based method may infer a reasonable HDR and omnidirectional lighting for an unconstrained low dynamic range (LDR) image with some parts with a limited field of view. For training data, videos of various reflective balls disposed in the field of view of the camera may be collected and maintained with a background mostly unobstructed, and other lighting clues may be displayed with a single exposure using materials with different reflective functions. Then, a DNN may be trained by matching an LDR ground truth ball image with a rendered image using image-based relighting prediction such that it regresses from an LDR background image to HDR lighting. When the image processing is executed on a mobile device at an interactive frame rate, a virtual object may be realistically rendered on a real-world scene in mobile mixed reality (MR). However, an image resolution obtained through such a method (low-resolution panoramic image restoration for an unconstrained scene (a panoramic image having a resolution of 32×32)) may not satisfy rendering requirements of the MR. To solve such technical problems, the method and apparatus of one or more embodiments may generate lighting with a higher resolution, and this is because actual details reflected in a high-resolution panoramic image are important to render a virtual object with mirrors. In this case, the panoramic image may also be referred to as a lighting map.

In addition, a color of a light source may not be predicted using a typical lighting estimation model, and the typical lighting estimation model may need to use an actual color of the light source to remove a deviation of a lighting color between an image of a camera in an optical see through (OST) MR device and a real scene. Since a rendered image of a video see through (VST) MR device is synthesized using a lighting model estimated from a camera image, the same color deviation may occur when combined with the camera image. However, in the OST MR device, the rendered image may be projected onto a transparent optical combiner and fused with an actual image perceived by the human eye. When the camera has a color deviation, a virtual content rendered using a deviation lighting model may have a color deviation from an actual image seen by the human eye. Therefore, in a lighting estimation method of the OST MR, it may be necessary to estimate a lighting model having a light source color prediction for a computer graphics (CG) rendering engine to render a consistent image from virtual to real lighting.

In addition, in a typical method and apparatus, an input image may be directly encoded with global lighting features using an encoder-decoder network scheme which lacks fine control for an independent lighting component. In practice, not all local regions of an image contribute equally to determining the light source. For example, some local regions may provide more semantic clues to infer a direction of lighting, such as a shadow of an object (e.g., a vase, box, sofa, etc.), and reflection information of floors and mirrored surfaces. At the same time, estimating scene lighting from local context information may make it easier to solve knowledge learned by a network.

In addition, a method such as EnvMapNet for HDR lighting image estimation may predict a full high-resolution panoramic lighting image directly using a generation model. Due to lack of a large-scale database for a high-quality panoramic HDR image, the above method may use a very limited number of images for training. When an input image is recorded in an LDR image with a limited field of view, it may be very difficult to infer a full HDR panoramic image. In addition, indoor scenes such as a school, apartment, museum, laboratory, factory, sports facility, and restaurant and outdoor scenes such as a park and street may have a variety of filming environments. In such different types of scenes/environments, there may be significant differences in features, structures, and textures of an object, and lighting conditions. Therefore, the method and apparatus of one or more embodiments may infer reasonable scene details from input incomplete shape clues and generalize a model with various scenes.

Based on at least the above problems, the method and apparatus of one or more embodiments may predict an HDR panoramic image and an actual light source color, that is applicable to various scenes, and this may be used to improve stability and adaptability in MR applications. The method and apparatus of one or more embodiments also may include a real-time network model configured to simultaneously predict an HDR panoramic image and a light source color. Also, the method and apparatus of one or more embodiments also may include a virtual reality (VR) fusion technology configured to render a very realistic image of a VST MR and OST MR device using a prediction result of a corresponding network model, thereby ensuring consistency between a virtual content and a real scene with lighting. In addition, the method and apparatus of one or more embodiments also may include an image block-based image processing model for capturing a local context clue and searching for a reliable image block which improves accuracy of scene lighting estimation. Furthermore, the method and apparatus of one or more embodiments also may include a network model configured to decouple a lighting feature and a scene feature to reliably predict a lighting image having actual details.

In the description hereinafter, examples of a method and apparatus of the present disclosure will be described in more detail with reference to various examples and drawings.

FIG. 1 illustrates an example of an image processing method. While the operations of FIG. 1 may be performed in the shown order and manner, the order of one or more of the operations may be changed, one or more of the operations may be omitted, and/or one or more of the operations may be performed in parallel or simultaneously, without departing from the spirit and scope of the shown examples.

The image processing method of the present disclosure may be a lighting estimation method. The method shown in FIG. 1 may be implemented through an image processing model (also referred to as a lighting estimation model) of the present disclosure. Each module of the image processing model may be implemented with a neural network. The image processing method may be performed by an electronic device having an image processing function. The electronic device may be, for example, a smartphone, tablet, laptop, desktop computer, etc.

Referring to FIG. 1, in operation 110, in the image processing method, an input image is obtained.

For example, in the image processing method, an image captured with a camera may be used as the input image. When an indoor or outdoor scene is captured using a camera, a panoramic image may not be captured due to a limited field of view of the camera. For example, the input image may be a limited view image, a color image of the limited view, and/or an incomplete color image of a scene. For example, the input image may be an LDR image of the limited view.

In operation 120, in the image processing method, a light source color information of a scene corresponding to the input image and a panoramic image corresponding to the input image may be predicted using the image processing model.

According to an example of the present disclosure, the light source color information of the scene corresponding to the input image and the panoramic image corresponding to the input image may be simultaneously predicted using the image processing model. The image processing model may be implemented with a neural network.

In an example, the image processing model may include an encoding network (e.g., implemented by an encoder) and a first prediction network (e.g., implemented by a first predictor). The image processing model may obtain (e.g., generate or determine) an encoded feature of the input image by encoding the input image using the encoding network of the image processing model, and predict the corresponding light source information and the panoramic image based on the encoded feature using the first prediction network of the image processing model.

In an example, the encoding network of the present disclosure may be implemented by an autoencoder. The autoencoder may compress an original spatial feature of the input image into a latent spatial feature (e.g., encoded feature) through encoding mapping for the subsequent decoding task. Also, the encoding network may be implemented in other neural networks. That is, the above example is merely an example, and the present disclosure is not limited thereto.

When the encoded feature of the input image is obtained, the encoded feature may be input to the first prediction network implemented with a neural network, and the first prediction network may output the light source color information and the panoramic image corresponding to the input image.

In another example, the image processing model may include an encoding network (e.g., implemented by an encoder), a second prediction network (e.g., implemented by a second predictor), and a decoding network (e.g., implemented by a decoder). When the encoding network outputs the encoded feature, the light source color information corresponding to the input image may be predicted based on the encoded feature using the second prediction network of the image processing model. The panoramic image corresponding to the input image may be predicted by decoding the encoded feature using the decoding network of the image processing model.

In the present disclosure, the second prediction network may be referred to as a light source color predictor for predicting a lighting color of a scene corresponding to a captured image.

For example, the second prediction network may be configured with a two-layer or three-layer convolutional network, though the convolutional network is not limited thereto and may include four or more layers. The encoded feature of the input image may be output including a three-dimensional (3D) vector indicating the light source color of the scene corresponding to the image through the convolutional network. The above example is merely an example, and the present disclosure is not limited thereto.

In another example, the decoding network may obtain an HDR panoramic image corresponding to the input image by decoding the encoded feature. In the present disclosure, the HDR panoramic image may be referred to as an HDR lighting panorama, lighting panorama, lighting image, etc., and the present disclosure is not limited thereto.

For example, the decoding network of the present disclosure may be implemented by an auto-decoder corresponding to an autoencoder that obtains an HDR panoramic image by reconstructing a latent spatial feature. In the present disclosure, a decoder for predicting a panoramic image may be referred to as a light decoder.

For example, the neural network (e.g., EnvMapNet) may be used as the encoding network and the decoding network of the present disclosure for predicting an HDR panoramic image. The convolutional network may be used as the second prediction network of the present disclosure for predicting a lighting color corresponding to the input image. In the present disclosure, the encoding network used for the encoding may be implemented by an encoder, the decoding network used to decode the encoded feature may be implemented by a decoder, and the prediction network used to predict the light source color may be implemented by a predictor.

According to another example of the present disclosure, the second prediction network for predicting the light source color may be an image block-based prediction network, and the encoding network may output encoded features of a plurality of image blocks divided from the input image. In addition, the image block-based prediction network may predict a light source color of a scene corresponding to each image block.

Figure 2:
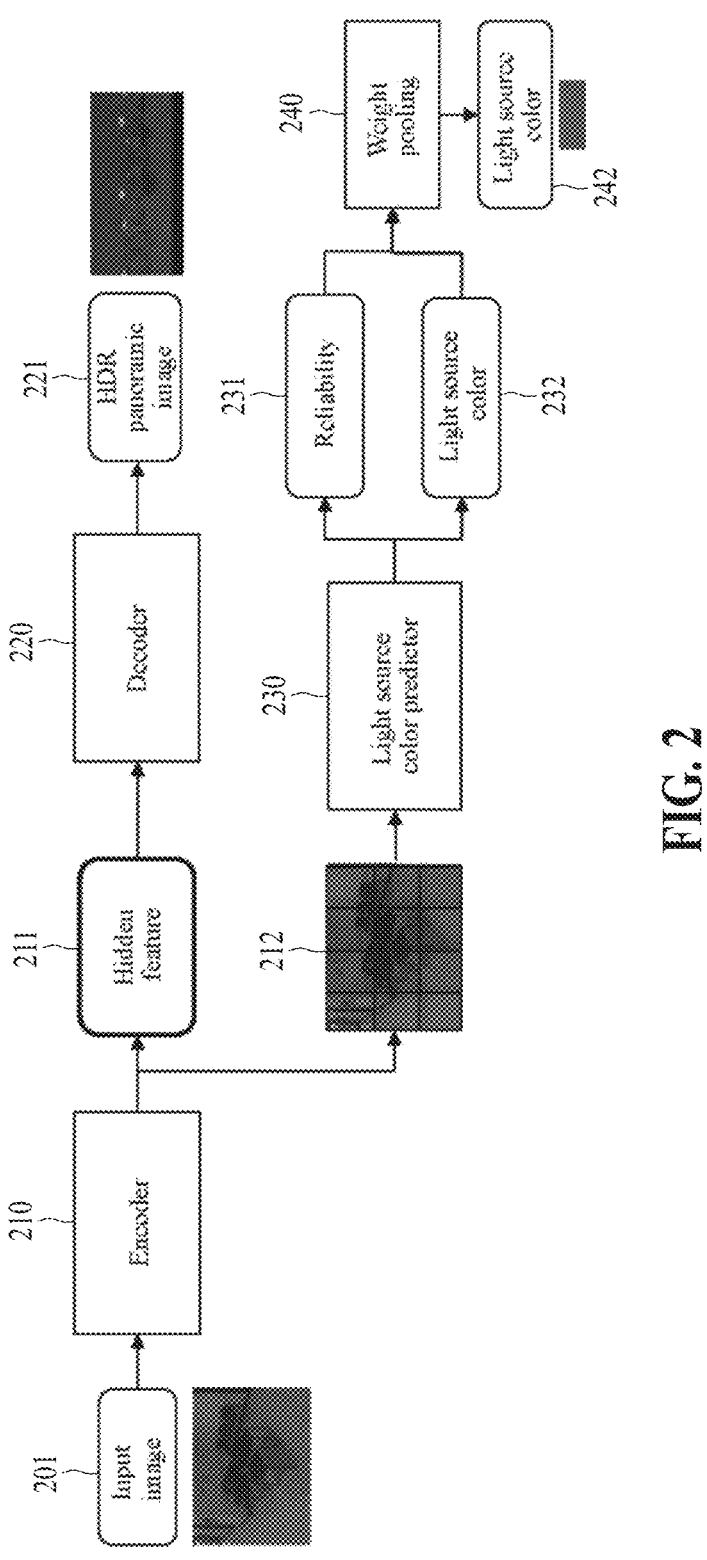
FIG. 2 illustrates an example of an image processing process.

FIG. 2 illustrates an example of an image processing process.

Figure 16:
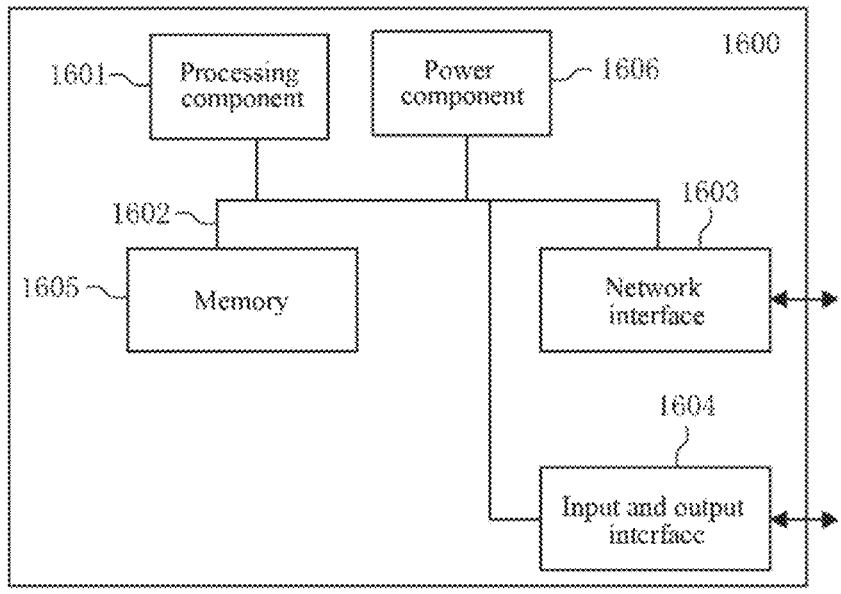
FIG. 16 illustrates an example of a structure of an image processing apparatus in a hardware operating environment.
Figure 17:
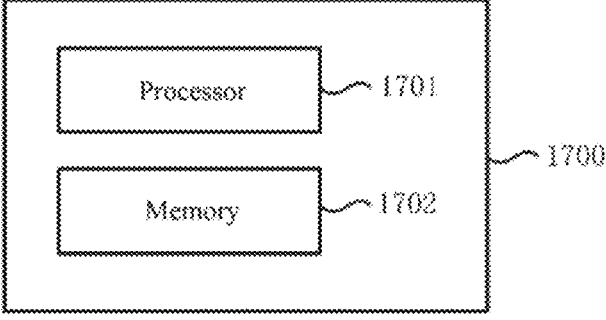
FIG. 17 illustrates an example of an electronic device.

Referring to FIG. 2, the image processing model may be implemented by an encoder 210, a decoder 220, and a light source color predictor 230 of an apparatus of one or more embodiments (e.g., either one or both of an image processing apparatus 1600 of FIG. 16 and an electronic device 1700 of FIG. 17).

As an input image 201 passes through the encoder 210, a hidden feature 211 corresponding to a global encoded feature of the input image 201 may be obtained, and as the hidden feature 211 passes through the decoder 220, an HDR panoramic image 221 may be obtained. Here, the encoder 210 and decoder 220 may be implemented as an encoder and decoder implementing EnvMapNet, as a non-limiting example.

Based on this, the light source color information of the scene corresponding to the image block is obtained by adding the image block-based light source color predictor 230. For example, the light source color predictor 230 may be implemented using a two-layer or three-layer convolutional network, though the convolutional network is not limited thereto and may include four or more layers. The encoder 210 may divide the input image 201 according to a preset image block dividing method to generate a plurality of image blocks (e.g., N×M image blocks, where N and M are integers greater than 0), and encode each image block to obtain an encoded feature of each image block. For example, the input image may be divided into 3×4=12 image blocks, and a spatial dimension of the encoded feature output from the encoder may be 3×4. An input of the light source color predictor 230 may be an encoded feature 212 with a spatial dimension of N×M in response to the feature encoding, and the light source color predictor 230 may estimate a reliability 231 and a light source color 232 of the encoded feature 212 of each image block of the encoded feature 212. Here, the reliability 231 may indicate a ratio/weight (e.g., 95%) of a corresponding image block when estimating a light source color of the entire image. The image processing model may perform weight pooling on the light source color 232 of the image block based on the reliability 231 of each image block in operation 240, and may obtain light source color information 242 of a scene corresponding to the input image 201.

The image processing model implemented in FIG. 2 may output the high-resolution HDR panoramic image 221 and the light source color information 242 of a 3D vector. The HDR panoramic image 221 may reflect information such as a direction, distribution, and intensity of lighting in all directions of the scene, and the light source color information 242 may reflect the lighting color of the scene. For example, the light source color information 242 may be information related to an actual lighting of an actual captured scene. The light source color information 242 may be expressed as RGB values, but is not limited thereto.

Figure 3:
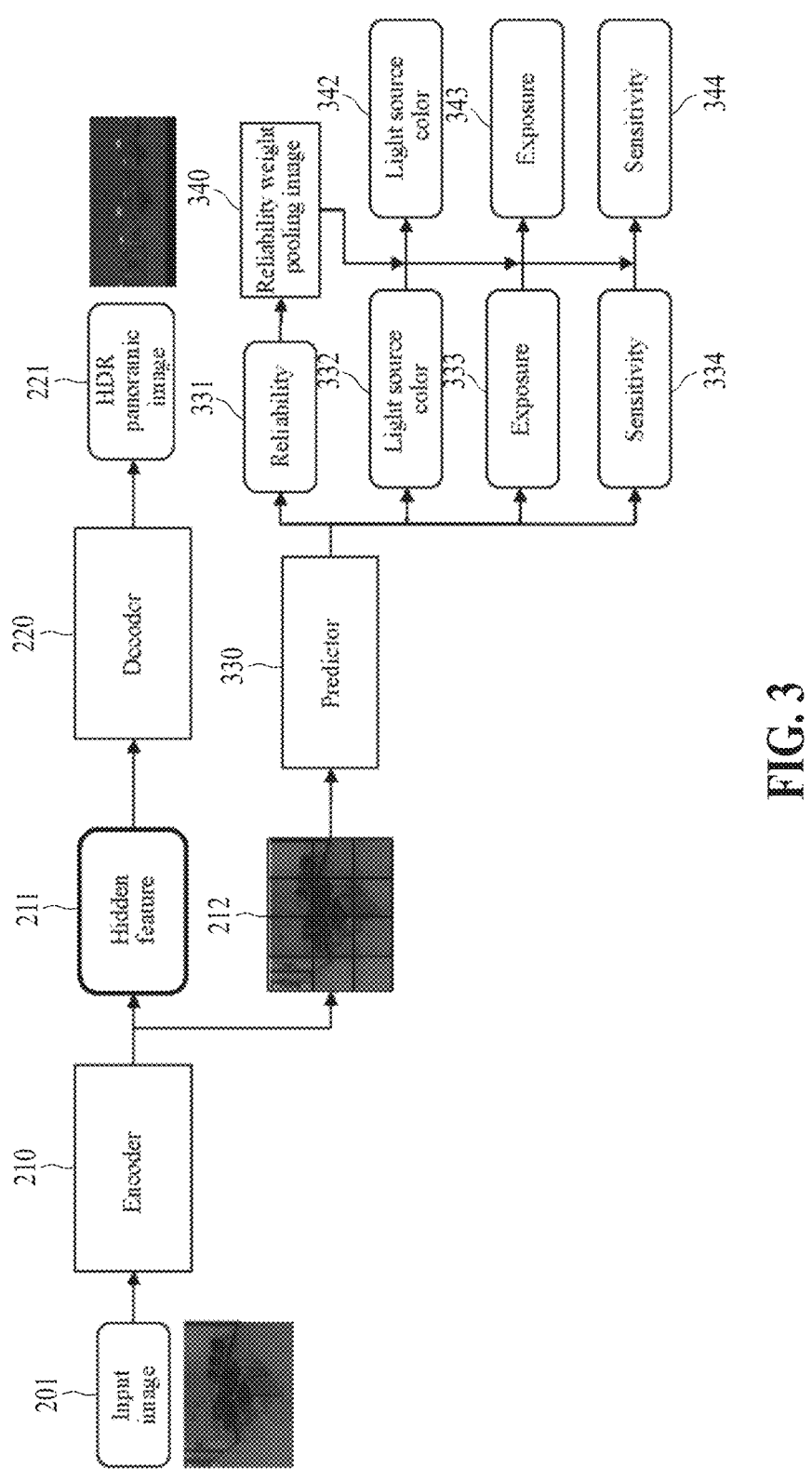
FIG. 3 illustrates an example of an image processing process.

FIG. 3 illustrates an example of an image processing process.

In addition to the predicted light source color shown in FIG. 2, the present disclosure may be extended to estimate camera parameters of the captured image, such as exposure and sensitivity.

Referring to FIG. 3, when the input image 201 is received, the encoder 210 may obtain the hidden feature 211 corresponding to the global encoded feature of the input image 201. When the hidden feature 211 is received, the decoder 220 may obtain the HDR panoramic image 221. Here, the encoder 210 and the decoder 220 may be implemented as an encoder and a decoder implementing EnvMapNet, as a non-limiting example.

When the encoded feature 212 of each image block of the input image 201 is obtained from the encoder 210, a predictor 330 may predict camera parameters (e.g., an exposure 333 and a sensitivity 334) of each image block and a light source color 332 and a reliability 331 of the image block based on the encoded feature 212 of each image block, and obtain each of a light source color 342 and camera parameters (e.g., an exposure 343 and a sensitivity 344) corresponding to the input image 201 using a weight pooling task based on the reliability 331 in operation 340.

The predictor 330 shown in FIG. 3 may include the light source color predictor 230 shown in FIG. 2 and may also include a corresponding predictor for predicting the camera parameters. The predictor 330 may also be used to predict camera parameters, a light source color, and a reliability.

By predicting more camera parameters, the image processing model of one or more embodiments may be a more intelligent technology for augmented reality (AR) and MR to achieve virtual reality fusion in a highly realistic way.

Figure 4:
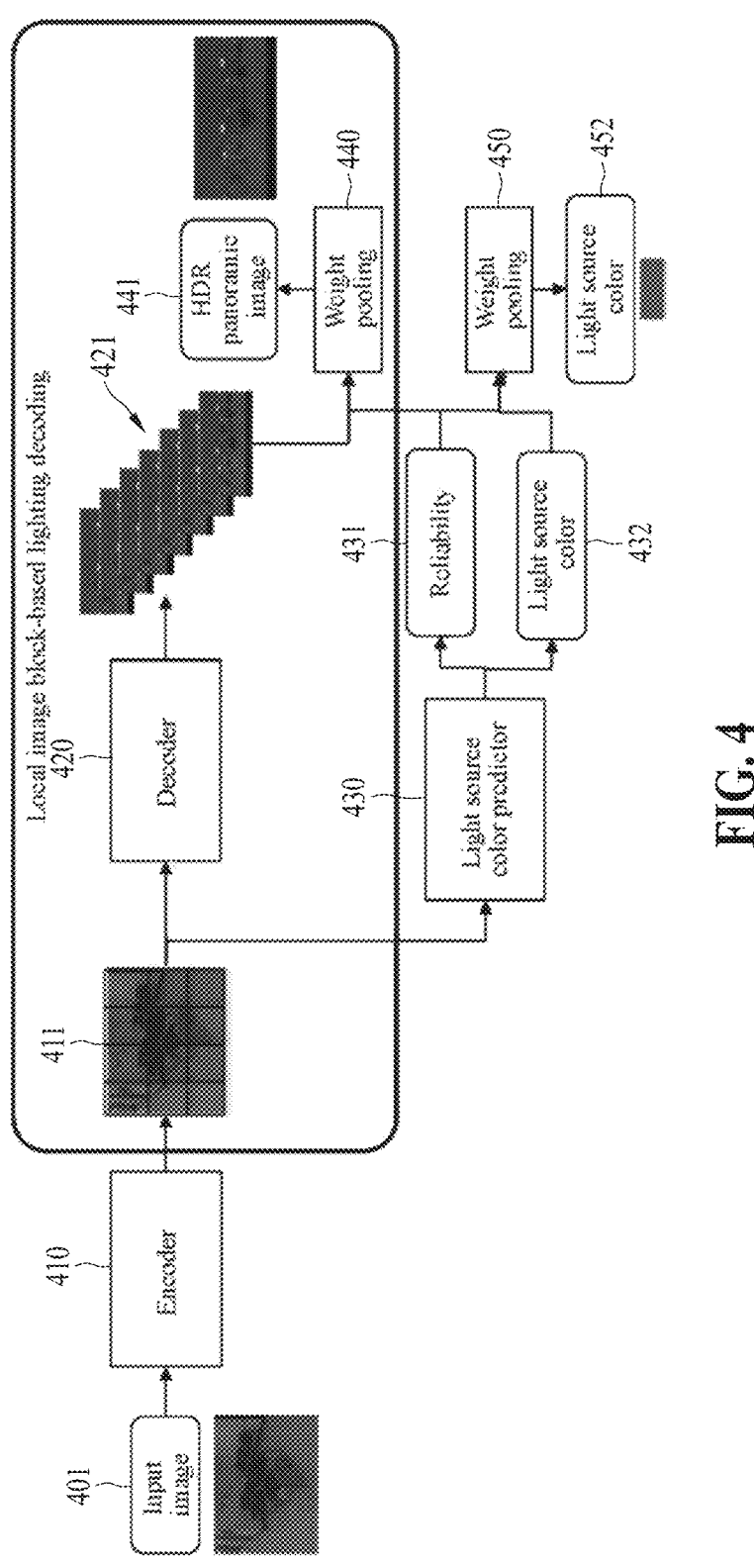
FIG. 4 illustrates an example of an image processing process.

FIG. 4 illustrates an example of an image processing process.

A method of one or more embodiments shown in FIG. 4 may more accurately predict an HDR panoramic image based on local features of different image blocks, compared to a typical method.

Referring to FIG. 4, an input image 401 may be a color image of a limited view or an incomplete color image. When an encoder 410 receives the input image 401, an encoded feature 411 of each image block of the input image 401 may be obtained. For example, a spatial dimension of the encoded feature 411 output by the encoder 410 implemented by a convolutional neural network (CNN) may be N×M, that is, the input image may divided into N×M image blocks.

An image block-based decoder 420 may decode each encoded feature 411 of each image block to obtain an HDR image 421 corresponding to each image block. For each image block of the input image 401, a light source color predictor 430 may predict a light source color 432 of a scene corresponding to the image block based on the encoded feature 411 of the image block, and determine a reliability 431 of the corresponding image block.

In operation 440, the image processing model may perform weight pooling of the HDR image 421 corresponding to each image block based on the reliability 431 of each image block. For example, the image processing model may obtain an HDR panoramic image 441 corresponding to the input image 401 using self-adaptive weight pooling as the weight pooling in operation 440.

The image processing model may perform weight pooling of the light source color 432 of the image block based on the reliability 431 of the image block in operation 450, and obtain the light source color information 452 of a scene corresponding to the input image 401.

There may be specific connections between image blocks that reflect lighting information in an image, such as the possibility that an object shadow covers a plurality of image blocks, and/or that objects of a plurality of image blocks may have shadow information. Accordingly, information connection between image blocks may be very helpful to accurately predict lighting details. A task of intensively learning and selecting a content related to lighting information may be completed by configuring an attention mechanism.

Figure 5:
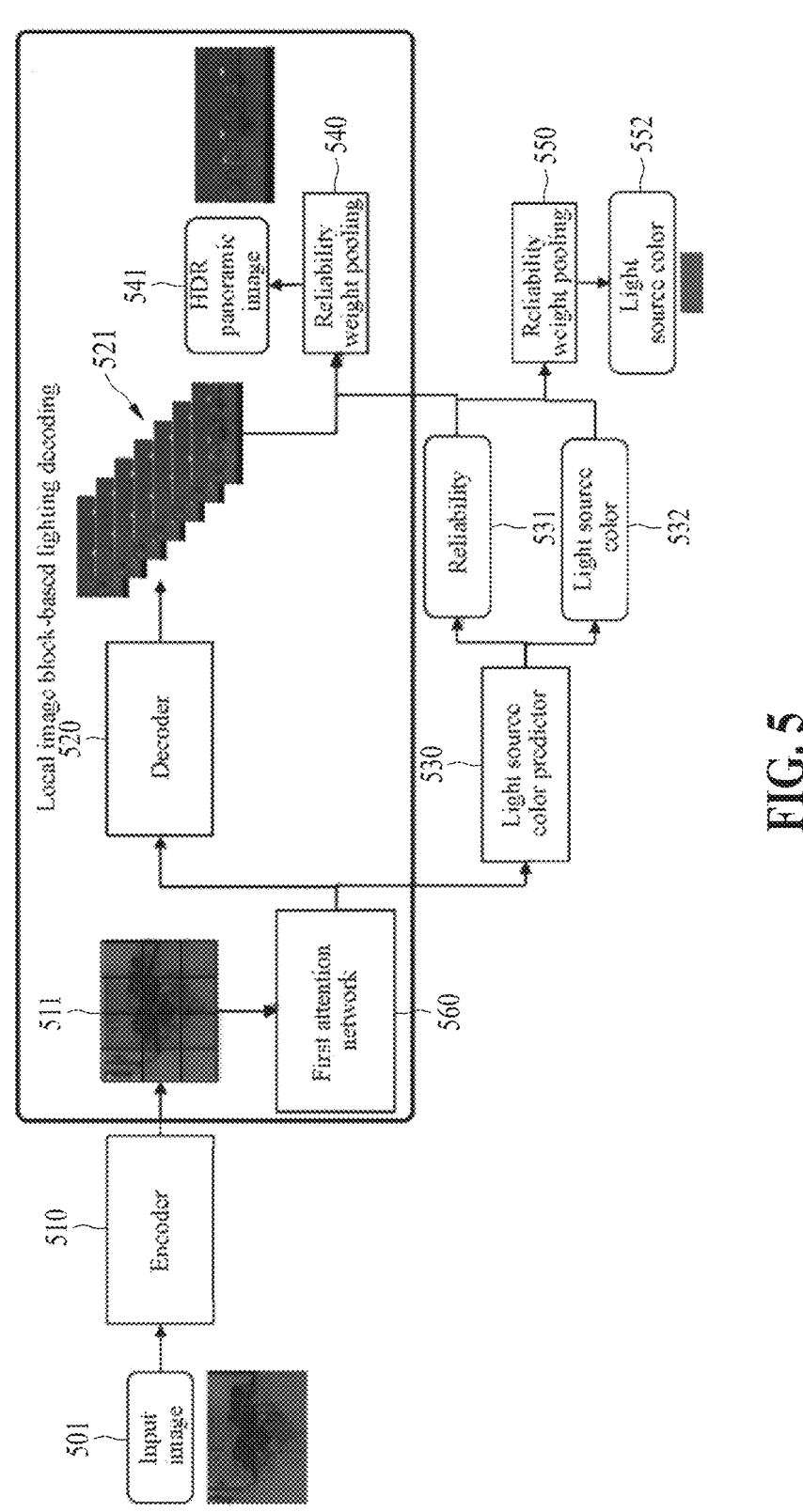
FIG. 5 illustrates an example of an image processing process.

FIG. 5 illustrates an example of an image processing process.

Referring to FIG. 5, an encoder 510 may encode a plurality of divided image blocks of an input image 501 to obtain an initial encoded feature 511 of each image block. A first attention network 560 of an image processing model may be used to improve an initial encoded feature of each image block to obtain an improved encoded feature of each image block. For example, the first attention network 560 may be implemented as a transformer network. Various encoded features 511 input to the first attention network 560 may be applied to the attention mechanism.

For example, the encoded feature 511 of each image block obtained through the encoder 510 may be output as an enhanced encoded feature of the image block through the first attention network 560. An attention task of an image block may be configured with the image block as a basic token of the attention task. The first attention network 560 may work on the initial encoded feature of the image block (e.g., the encoded feature of each image block output from the encoder) using a self-attention mechanism. The image processing model may obtain an HDR panoramic image 541 and a light source color information 552 of a captured image scene by inputting the improved image block encoded feature to the decoder 520 and a light source color predictor 530.

The decoder 520 may decode the improved image block encoded feature to obtain an HDR image 521 corresponding to each image block. For each image block of the input image 501, the light source color predictor 530 may predict a light source color 532 of a scene corresponding to the image block based on the improved image block encoded feature, and determine a reliability 531 of the corresponding image block.

In operation 540, the image processing model may perform weight pooling of the HDR image 521 corresponding to each image block based on the reliability 531 of each image block. For example, the image processing model may obtain the HDR panoramic image 541 corresponding to the input image 501 using self-adaptive weight pooling as the weight pooling in operation 540.

The image processing model may perform weight pooling of the light source color 532 of the image block based on the reliability 531 of the image block in operation 550, and obtain the light source color information 552 of a scene corresponding to the input image 501.

The examples may all be performed for the global feature of the input image. According to one or more embodiments, a lighting feature (which may be referred to as a lighting hidden feature or a hidden feature representation of lighting) and a scene feature (which may be referred to as a scene hidden feature or a hidden feature representation of a scene content) may be decoupled from the global feature output from the encoder, thereby ensuring accuracy of light estimation and rationality of scene generation. Here, the lighting feature may indicate a related feature that reflects a lighting color of a scene, and the scene feature may indicate a related feature of a scene in which an image is captured. For example, the scene feature may include a scene structure feature and a texture feature.

Figure 6:
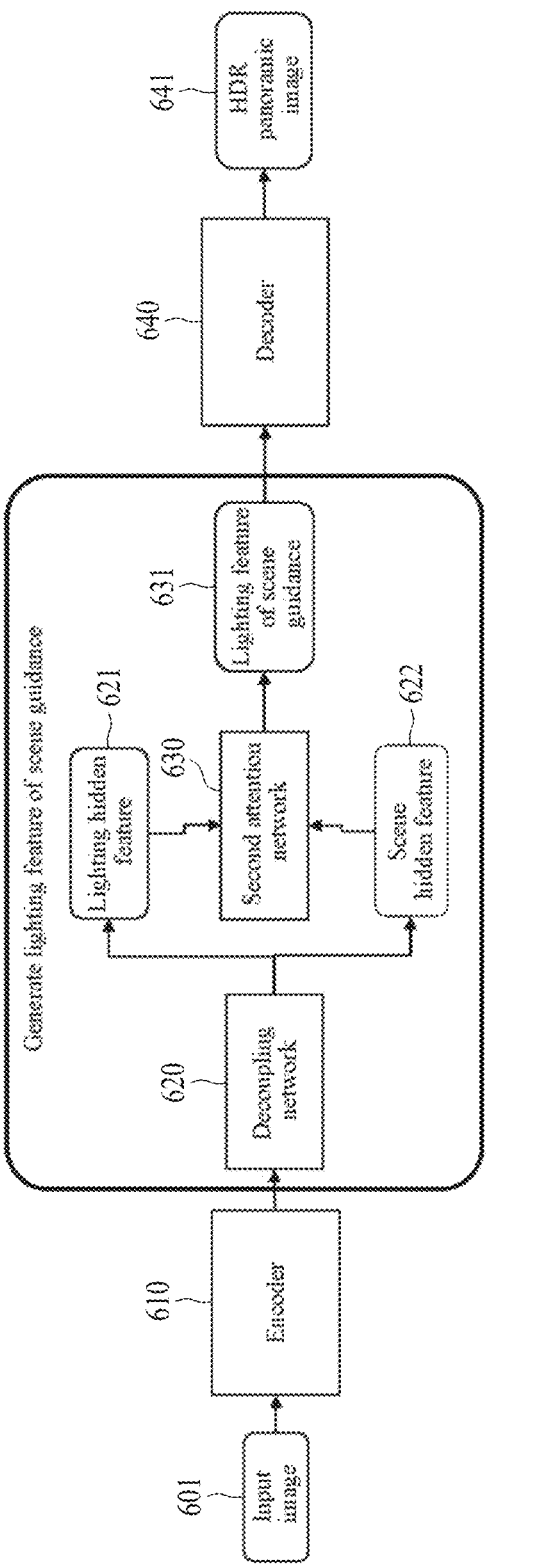
FIG. 6 illustrates an example of an image processing process.

FIG. 6 illustrates an example of an image processing process.

In an image processing process, an input image may be encoded using an encoder implementing an image processing model, and a global feature of the input image may be obtained. In the image processing process, a lighting feature and a scene feature may be obtained by decoupling the features from the global feature using a decoupling network of the image processing model. In the image processing process, a scene-based lighting feature may be obtained by improving the lighting feature and the scene feature using a second attention network of the image processing model. The scene-based lighting feature may be used to predict light source color information of a scene corresponding to the input image and decode an HDR panoramic image.

Referring to FIG. 6, when an input image 601 is received, the encoder 610 may encode the input image and obtain a global image feature. When the global image feature is received, a decoupling network 620 may obtain a lighting hidden feature 621 and a scene hidden feature 622 through a decoupling operation. For example, the decoupling operation of the decoupling network 620 may be a mapping operation that converts the lighting hidden feature and the scene hidden feature into two independent feature items.

A second attention network 630 may obtain a lighting feature 631 of scene guidance by applying an attention mechanism to the scene hidden feature 622 representing a scene content and the lighting hidden feature 621. A decoder

640 may output an HDR panoramic image 641 based on the lighting feature 631 of the scene guidance.

Figure 7:
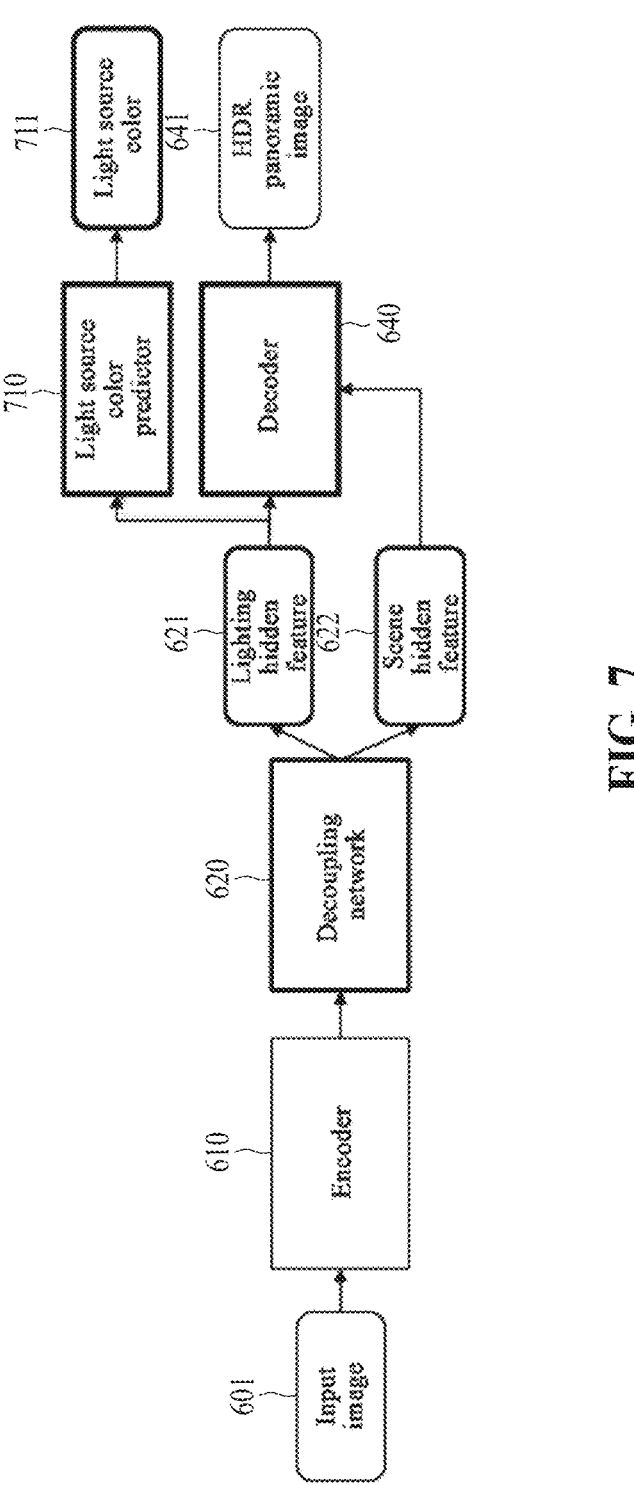
FIG. 7 illustrates an example of an image processing process.

FIG. 7 illustrates an example of an image processing process.

Referring to FIG. 7, when the input image 601 is received, the encoder 610 may encode the input image and obtain a global image feature of each image block. When the global image feature of each image block is received, the decoupling network 620 may obtain the lighting hidden feature 621 and the scene hidden feature 622 of each image block through the decoupling operation. The second attention network 630 may obtain the lighting feature 631 of scene guidance by applying an attention mechanism to the scene hidden feature 622 representing a scene content and the lighting hidden feature 621. Here, the lighting feature 631 guided by the scene may indicate that the corresponding lighting feature includes some features extracted from scene information to represent lighting. The image block-based decoder 640 (which may be referred to as a local image block-based light decoder) may obtains an HDR image of each image block based on the lighting feature 631 of the scene guidance, and output the HDR panoramic image 641 through a reliability-based weight pooling operation.

An image block-based light source color predictor 710 may output light source color information of a scene corresponding to each image block based on the lighting feature 631 of the scene guidance, and output a light source color 711 of the scene corresponding to the input image through the reliability-based weight pooling operation.

Returning to the description with reference to FIG. 1, in operation 130, in the image processing method, a rendered image may be obtained by performing image rendering based on the predicted light source color information and/or the panoramic image.

According to an example of the present disclosure, a single image processing model may be used to perform the image rendering of the VST device and the OST device.

In a case of the VST device, the rendered image may be obtained by performing the image rendering based on the input image, the predicted HDR panoramic image, and virtual object-related information, and the rendered image may output through the VST device.

In a case of the OST device, a panoramic image of a white light source may be obtained by correcting a color of the predicted panoramic image based on the predicted light source color information using a white balance method. In the image processing method, a first rendered image may be obtained by rendering the image based on the panoramic image of the white light source and the virtual object-related information, actual light source color information of a real scene may be obtained by mapping the predicted light source color information, a second rendered image may be obtained by adjusting a color of the first rendered image using the actual light source color information, and a target image formed by superimposing the input image and the second rendered image may be output through the OST device. For example, the mapping operation may be implemented through a lightweight neural network.

Figure 8:
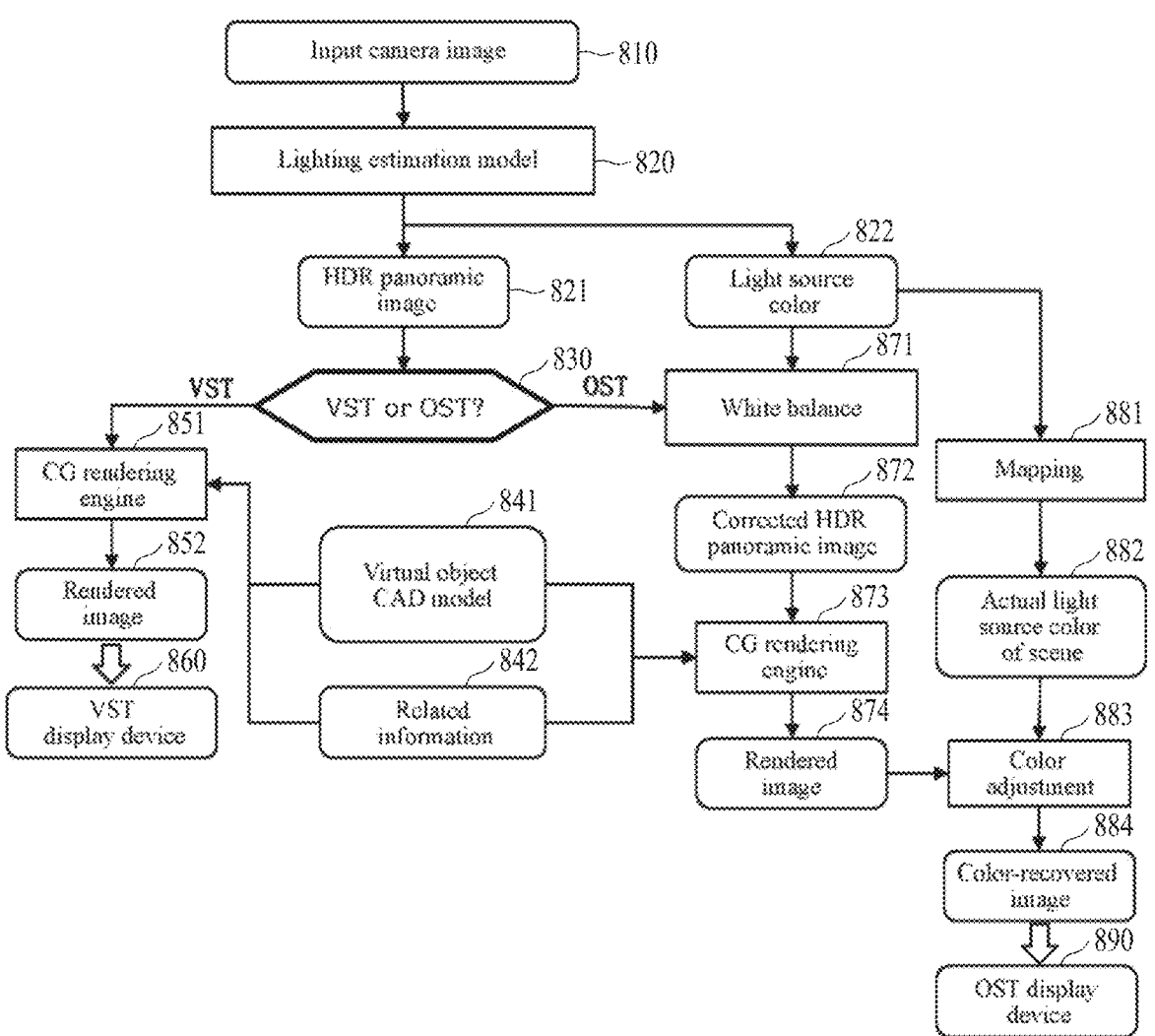
FIG. 8 illustrates an example of a rendered image.

FIG. 8 illustrates an example of a rendered image.

Referring to FIG. 8, in an image processing method, when a camera image is received in operation 810, an HDR panoramic image 821 and light source color information 822 may be obtained using an image processing model 820 (e.g., any of the image processing models described above with reference to FIGS. 1-7).

In operation 830, in the image processing method, it is confirmed whether an apparatus for processing an image is a VST device or an OST device.

When it is determined that the apparatus is the VST device as a result of the confirmation in operation 830, a CG rendering engine 851 (e.g., a CG renderer) of the image processing method may obtain a rendered image 852 by directly using and rendering the predicted HDR panoramic image 821, a virtual object and related information 842 (e.g., information on a position, posture, direction, etc.) received from a virtual object computer aided design (CAD) model 841, and an actual image captured with the camera. The rendered image 852 may serve as an output of a VST device display 860.

When it is determined that the apparatus is the OST device as a result of the confirmation in operation 830, a color of the predicted HDR panoramic image 821 may be corrected by performing a white balance operation using the predicted light source color information 822 in operation 871, and a corrected HDR panoramic image 872 may be obtained as a result. The CG rendering engine 873 may obtain a rendered image 874 including only a virtual object using the corrected HDR panoramic image 872, and the virtual object and related information 842 received from the virtual object CAD model 841.

In the image processing method, in order to compensate a color deviation between an image captured by a camera and an actual image perceived by the human eye, in operation 881, a light source color corresponding to a camera image may be mapped to a light source color of a real scene using a simple mapping operation. For example, a predicted light source color may be mapped to an actual light source color of a scene through the mapping operation. The mapping operation may be implemented using a multilayer perceptron with two or three layers.

In the image processing method, a color of the rendered image 874 including only a virtual content may be adjusted using an actual light source color 882 of the mapped scene in operation 883, and a recovered rendered image 884 may be obtained and overlaid on a display 890 of the OST device.

The method of one or more embodiments may be used in the AR and MR system, real-time lighting source (that is, information reflecting a distribution and strength of a light source of an environment such as a lighting map and/or light source color information) of a surrounding environment of a user may be estimated in real time, the virtual object may be more naturally combined with the real environment by providing basis for rendering the virtual object, and a smooth AR experience may be supported through real-time inference.

Figure 9:
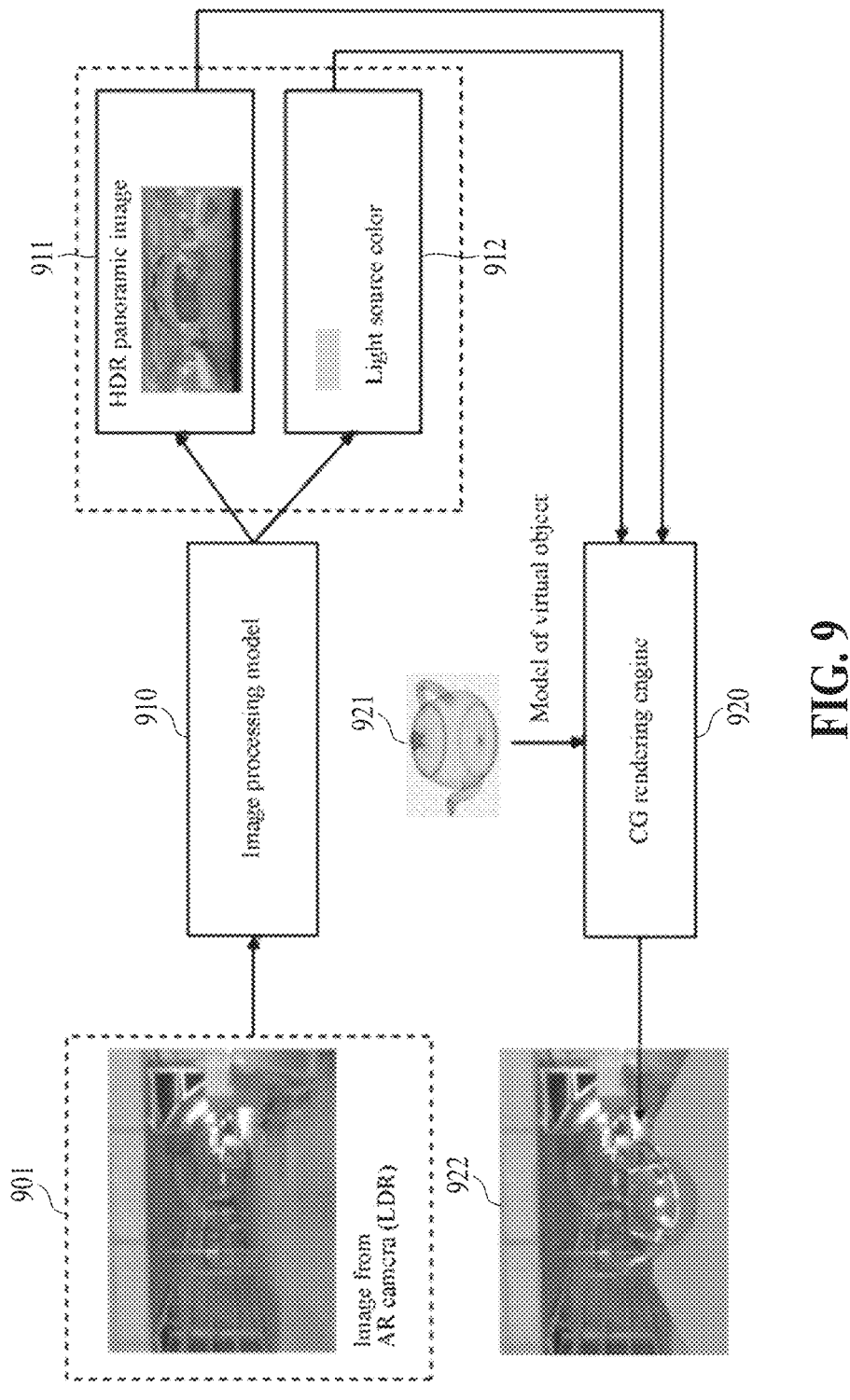
FIG. 9 illustrates an example of a rendered image.

FIG. 9 illustrates an example of a rendered image.

Referring to FIG. 9, an image processing model 910 of the present disclosure may receive an image 901 captured with an AR camera and obtain an HDR panoramic image 911 and a light source color 912 of a scene of the captured image. The high-resolution HDR panoramic image 911 may have many details for supporting very realistic rendering of a virtual content on a highlighted surface.

A CG rendering engine 920 of the VST device and/or OST device may obtain a rendered image 922 using the predicted HDR panoramic image 911, a virtual object 921, and related information and/or the light source color information 912.

The CG rendering engine 920 may render a virtual object into a real scene with realistic lighting. In particular, the CG rendering engine 920 may activate real reflection details on a surface of a mirror virtual object using the HDR panoramic image 911, and ensure that the virtual object has the same lighting color as the real scene particularly using the light source color information 912 in an OST headset.

The method of one or more embodiments may achieve the effect of estimating lighting and rendering a mirror object using a lighting model. The method of one or more embodiments may be applied to various types of scenes (e.g., a living room, office, store, restaurant, street, park, etc.) and applied to real complex application scenes. In addition, the method of one or more embodiments may process lighting of various devices (OST and VST) using a lighting model and render a virtual content and a real scene with consistent lighting.

Figure 10:
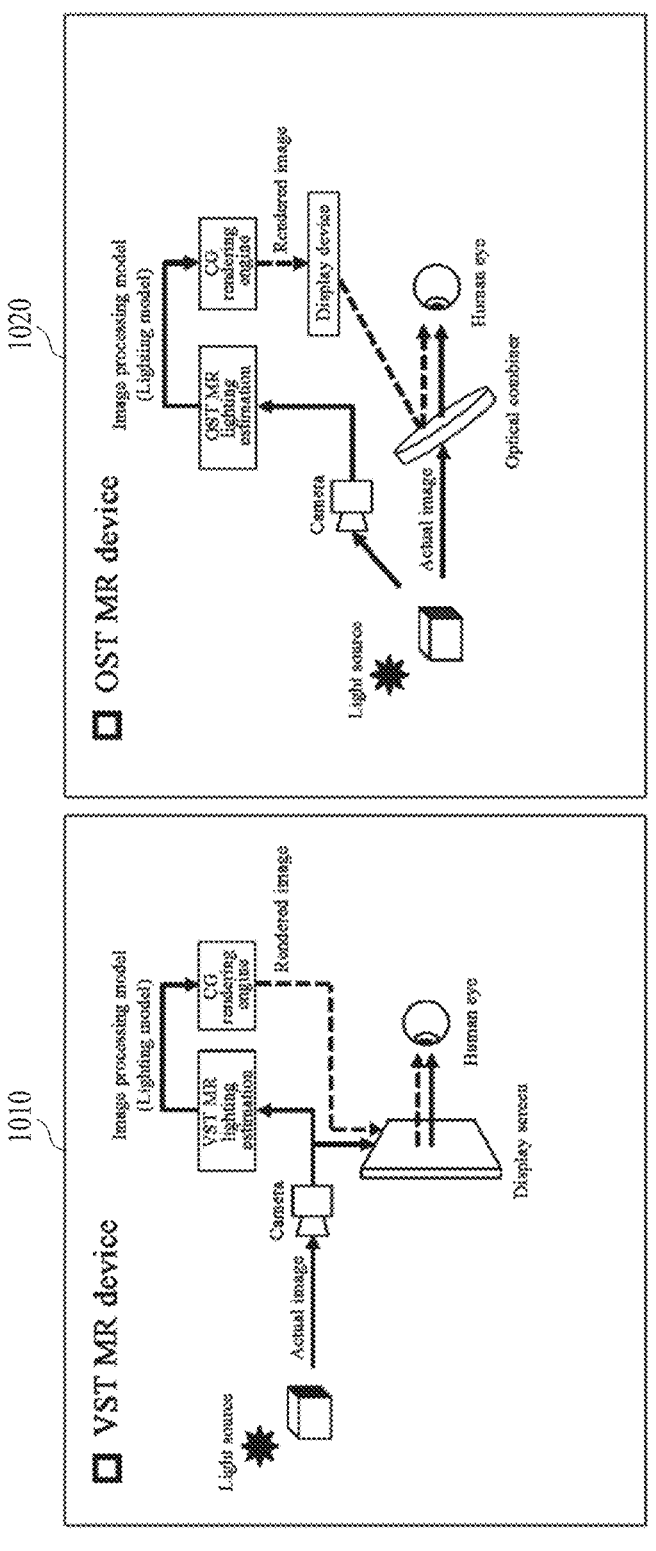
FIG. 10 illustrates an example of rendered images of a video see through mixed reality (VST MR) device and an optical see through (OST) MR device.

FIG. 10 illustrates an example of rendered images of a VST MR device and an OST MR device.

FIG. 10 shows a difference in a virtual combination process of an OST MR device 1010 and a VST MR device 1020.

Referring to FIG. 10, in the VST MR device 1010, an actual image of the world may be captured by a camera and combined with a rendered image displayed on a screen. When a camera image has a color deviation, the human eye may not perceive significant color discrepancy between the actual image and the rendered image. This is because the rendered image is synthesized using a lighting model estimated from the camera image and thus has the same color deviation.

In the OST MR device 1020, the rendered image may be projected onto a transparent optical combiner and fused with the actual image perceived by the human eye. When the camera image has a color deviation, a virtual object rendered with biased lighting may have a color deviation from the actual image visible to the human eye. Therefore, the OST MR device 1020 may provide lighting estimation including an actual light source color for a CG rendering engine in order to render an image in which colors between a virtual object and the actual lighting are matched.

Figure 11:
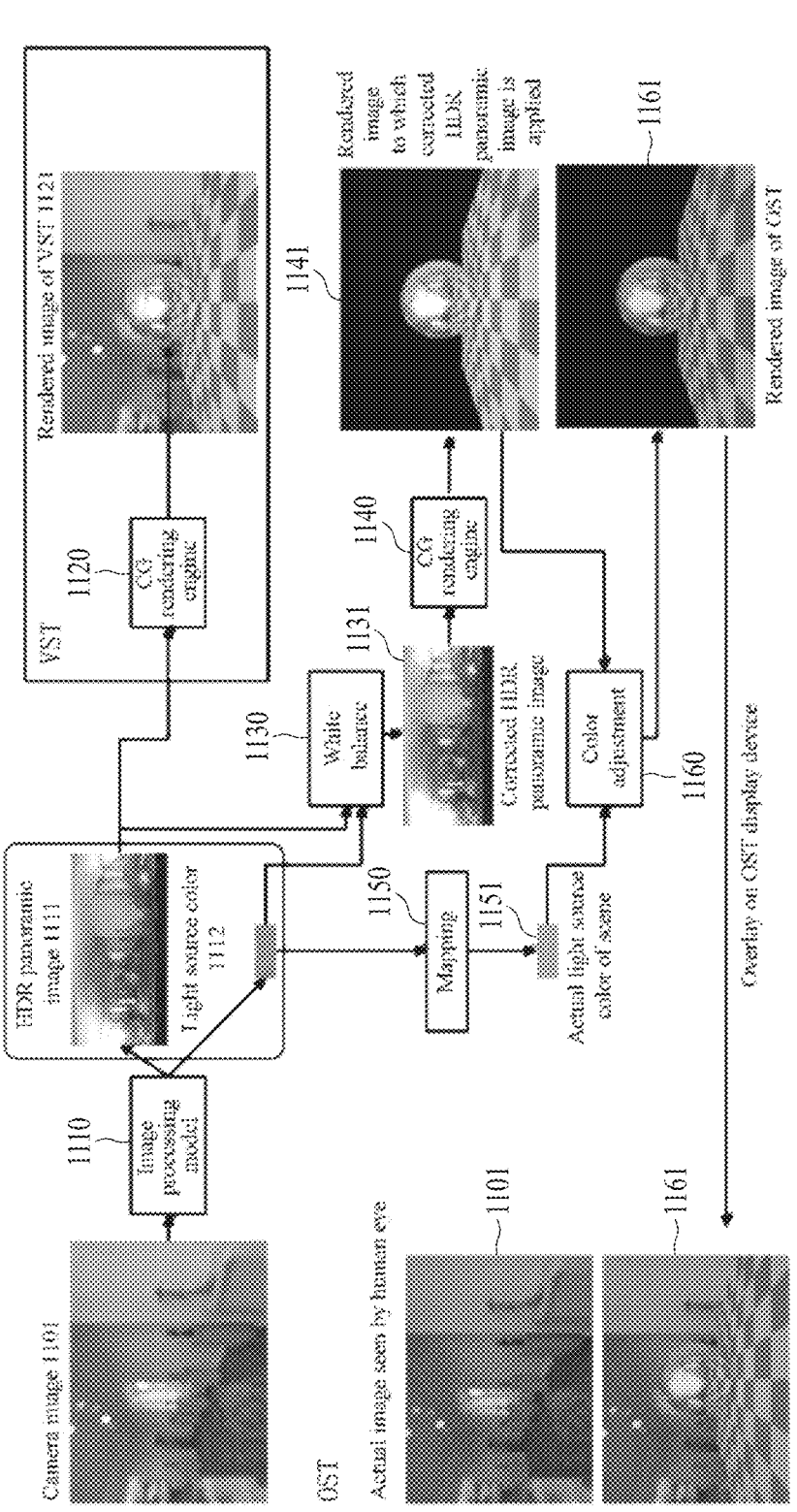
FIG. 11 illustrates an example of a rendered image.

FIG. 11 illustrates an example of a rendered image.

Referring to FIG. 11, in the image processing method of the present disclosure, an HDR panoramic image 1111 of a camera image 1101 and light source color information 1112 of a scene reflected onto the camera image 1101 may be predicted using an image processing model 1110. By using the rendering process described with reference to FIG. 8, the image processing method of one or more embodiments may render an image with another device (e.g., a VST device or OST device) such that lighting of a virtual object and a real scene are consistent in the other device.

In the image processing method, in a case of the VST device, a CG rendering engine 1120 may perform rendering directly using the predicted HDR panoramic image 1111, a virtual object and related information (e.g., a position, posture, direction, etc.), and the camera image 1101, and obtains a rendered image 1121.

In the image processing method, in a case of the OST device, a color of the HDR panoramic image 1111 may be corrected by performing a white balance operation 1130 using the light source color information 1112, and a corrected HDR panoramic image 1131 may be obtained. A CG rendering engine 1140 may obtain a rendered image 1141 which includes only a virtual content and in which the corrected HDR panoramic image 1131 is applied, by using the corrected HDR panoramic image 1131, and the virtual object and related information 842.

In the image processing method, in order to compensate a color deviation between an image captured with a camera and an actual image perceived by the human eye, the light source color information 1112 corresponding to the camera image 1101 may be mapped with a light source color of a real scene using a simple mapping operation in operation 1150.

In the image processing method, a color of the rendered image 1141 including only the virtual content may be adjusted in operation 1160 using an actual light source color 1151 of the scene which is mapped above, and a rendered image 1161 of OST corresponding to a recovered rendered image may be generated and overlaid on a display of the OST device.

In the image processing method of one or more embodiments, lighting of a virtual object content rendered in the AR system may be controlled by estimating the lighting of a scene environment, and this may implement high-quality rendering of the virtual object and real-time interaction between the virtual object and the real scene.

Figure 12:
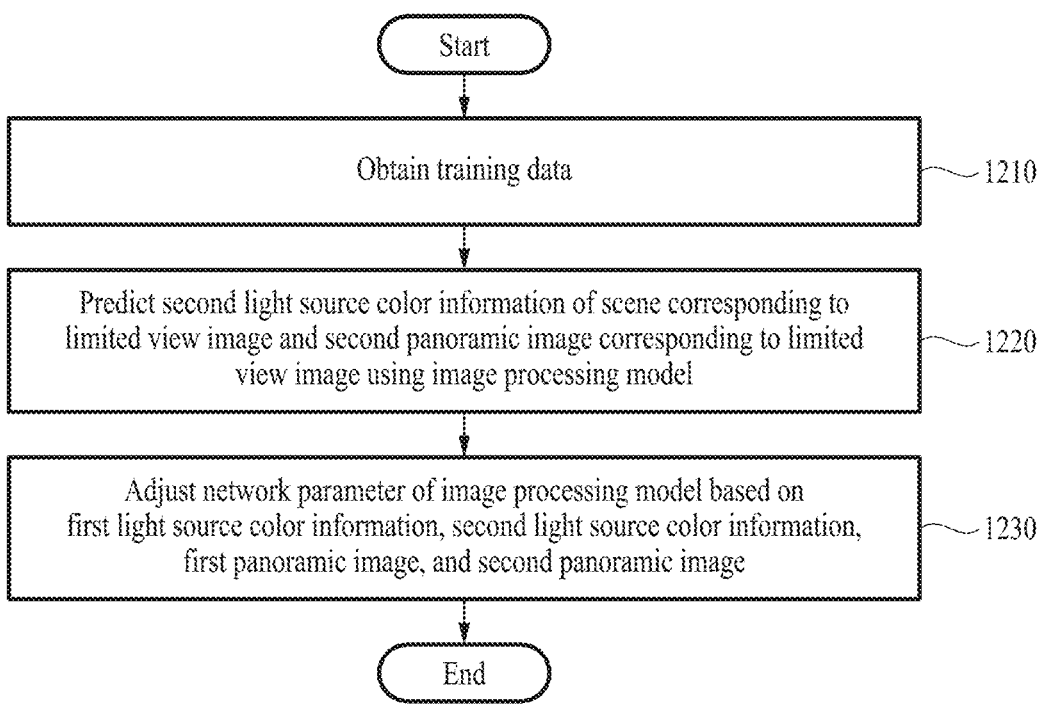
FIG. 12 illustrates an example of a method of training an image processing model.

FIG. 12 illustrates an example of a method of training an image processing model. While the operations of FIG. 12 may be performed in the shown order and manner, the order of one or more of the operations may be changed, one or more of the operations may be omitted, and/or one or more of the operations may be performed in parallel or simultaneously, without departing from the spirit and scope of the shown examples.

The image processing model of the present disclosure may be obtained through training on an electronic device or a server.

Referring to FIG. 12, in a training method, in operation 1210, training data may be obtained. The training data may include a limited view image with a different field of view under the same scene, a first panoramic image, and first light source color information when capturing the limited view image and the first panoramic image.

In the training method, since the number of complete panoramic images may be limited, an LDR color image with different field of view may be collected. In addition, in the training method, when obtaining an actual image, a color of a light source that captures the actual image may also be obtained together. In order to obtain sufficient a priori information about a scene content, an image with a different field of view may be captured in a different scene.

Figure 13:
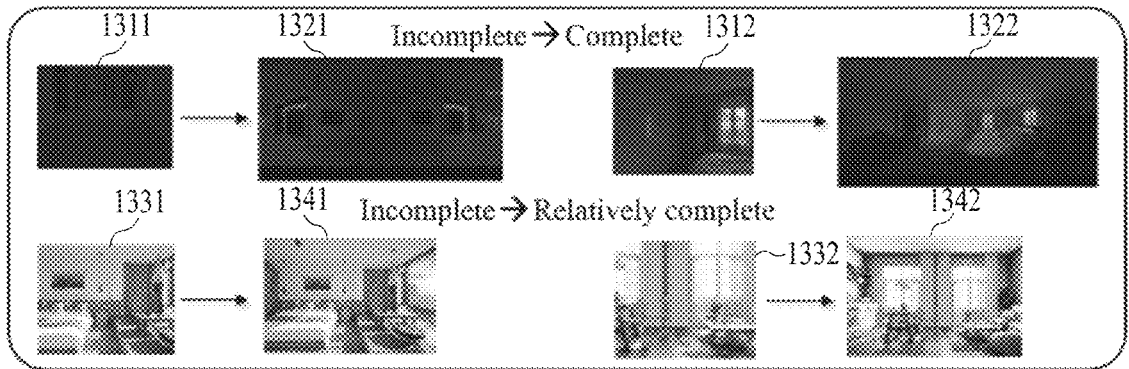
FIG. 13 illustrates an example of sample data.

FIG. 13 illustrates an example of sample data.

An image having a specific field of view may be used as an input of an image processing model, and an actual panoramic image or a relatively complete panoramic image including the image having the specific field of view may be used to compare with a predicted panoramic image. As shown in FIG. 13, when the image processing model is trained, a plurality of image pairs may be obtained. For example, in the training method, as complete images 1321 and 1322 of a scene corresponding to incomplete images 1311 and 1312 of the scene, and relatively complete images 1341 and 1342 of a scene corresponding to incomplete images 1331 and 1332 of the scene, sufficient training samples may be configured through this method. The image pair is a pair of images under the same scene.

Returning to the description with reference to FIG. 12, in the training method, in operation 1220, second light source color information of the scene corresponding to the limited view image and a second panoramic image corresponding to the limited view image may be predicted using the image processing model.

For example, when the image processing model includes an encoding network and a first prediction network, an encoded feature of the limited view image may be obtained by encoding the limited view image using the encoding network of the image processing model, and second light source color information and a second panoramic image may be predicted based on the encoded feature using the first prediction network of the image processing model. The first prediction network may be implemented as a neural network.

In addition, when the image processing model includes an encoding network, a first prediction network, and a decoding network, an encoded feature of the limited view image may be obtained by encoding the limited view image using the encoding network of the image processing model, second light source color information may be predicted based on the encoded feature using the second prediction network of the image processing model, and a second panoramic image may be predicted by decoding the encoded feature using the decoding network of the image processing model.

The encoding network of the present disclosure may be implemented by an autoencoder. The autoencoder may compress an original spatial feature of the limited view image into a latent spatial feature (i.e., the encoded feature) through encoding mapping for a subsequent decoding operation. The above example is merely an example, and the present disclosure is not limited thereto.

The second prediction network of the present disclosure may be configured with a two-layer or three-layer convolutional network, though the convolutional network is not limited thereto and may include four or more layers. The encoded feature of the limited view image may be output including a 3D vector indicating a light source color of a scene corresponding to the corresponding image through the convolutional network. The above example is merely an example, and the present disclosure is not limited thereto.

The decoding network of the present disclosure may be implemented by an auto-decoder corresponding to the auto-encoder. The auto-decoder may obtain an HDR panoramic image by reconstructing the latent spatial feature. For example, the neural network (e.g., EnvMapNet) may be an encoding network and a decoding network of the present disclosure, and may predict an HDR panoramic image, and predict lighting color information corresponding to the limited view image using the convolutional network as the second prediction network of the present disclosure.

In the training method, in operation 1230, a network parameter of the image processing model may be adjusted based on the first light source color information, the second light source color information, the first panoramic image, and the second panoramic image.

For example, in the training method, a first loss function may be configured based on the first light source color information and the second light source color information, a second loss function may be configured based on the first panoramic image and the second panoramic image, and a network parameter of the image processing model may be adjusted by minimizing a loss calculated with the first loss function and the second loss function. In another example, in the training method, the network parameter may be adjusted by supervised learning of a predicted HDR panoramic image and an actual panoramic image. In addition, a discriminator may determine whether an output HDR panoramic image is an actual image or a false image and further adjust the network parameter to make the predicted HDR panoramic image more realistic.

According to another example of the present disclosure, the image processing model may also predict relevant camera parameters for capturing an image. For example, the image processing model may simultaneously predict and output a panoramic image, light source color information, and camera parameters corresponding to the limited view image by the first prediction network. Alternatively or additionally, the image processing model may simultaneously output light source color information and camera parameters corresponding to the limited view image by the second prediction network. Alternatively or additionally, the image processing model may predict relevant camera parameters by adding another neural network (a 2-layer or 3-layer convolutional network) to the image processing model.

When predicting the camera parameters, the image processing model may obtain a first camera parameter of a captured image, and predict a second camera parameter for capturing a limited view image using the image processing model. In the training method, when training the image processing model, the network parameter of the image processing model is adjusted based on the first camera parameter, the second camera parameter, the first light source color information, the second light source color information, the first panoramic image, and the second panoramic image. For example, in the training method, a first loss function may be configured based on the first light source color information and the second light source color information, a second loss function may be configured based on the first panoramic image and the second panoramic image, a third loss function may be configured based on the first camera parameter and the second camera parameter, and the network parameter of the image processing model may be adjusted by minimizing a loss calculated with the first loss function, the second loss function, and the third loss function.

According to an example of the present disclosure, when the encoding network outputs an encoded feature based on an image block, the decoding network and the second prediction network may be a block-based decoding network and a block-based prediction network, respectively. The encoding network may obtain a plurality of image blocks by dividing the limited view image according to a preset image block dividing method, and obtain encoded features of the plurality of blocks as the encoded feature of the limited view image by encoding each of the plurality of image blocks. In the training method, for each image block of the plurality of image blocks, the block-based prediction network may predict light source color information of a scene corresponding to the image block based on the encoded feature of the image block, and determine a reliability of the image block. In the training method, the light source color information of the scene corresponding to the limited view image may be obtained by pooling the light source color information corresponding to the image block based on the reliability of each image block. The decoding network may obtain an HDR image corresponding to each image block by decoding the encoded feature of the plurality of image blocks. In the training method, a second panoramic image having an HDR corresponding to the limited view image may be obtained by performing pooling based on the reliability of each image block and the HDR image corresponding to the image block. Through this, in the training method, the network parameters of the encoding network, the block-based decoding network, and the block-based prediction network may be adjusted by minimizing the loss calculated with the first loss function and the second loss function.

According to another example of the present disclosure, the image processing model may further include a first attention network. In addition, the encoding network may obtain an initial encoded feature of each image block by encoding each of the plurality image blocks. The first attention network may improve a feature of the initial encoded feature of each image block, and obtain an improved encoded feature of each image block as an encoded feature of the plurality of image blocks. The block-based prediction network may predict light source color information of the scene corresponding to the image block based on the improved encoded feature of the image block, and determine a reliability of the image block. In the training method, the light source color information of the scene corresponding to the limited view image may be obtained by performing pooling based on the reliability of each image block and the light source color information corresponding to the image block. The decoding network may obtain an HDR image corresponding to each image block by decoding the improved encoding feature of the plurality of image blocks. In the training method, an HDR panoramic image may be obtained by performing pooling based on the reliability of each image block and the HDR image corresponding to the image block. In this case, in the training method, the network parameters of the encoding network, the block-based decoding network, the block-based prediction network, and the first attention network may be adjusted by minimizing a loss calculated with the first loss function and the second loss function.

According to another example of the present disclosure, the image processing model may further include a decoupling network and a second attention network. The encoding network may obtain a lighting feature and a scene feature by decoupling the feature of the limited view image. The second attention network may improve the feature of the lighting feature and the scene feature, and obtain the scene-based lighting feature as the encoded feature of the limited view image. The decoding network may obtain the HDR panoramic image by using the scene-based lighting feature, and the light source color prediction network may obtain the light source color information of the scene of the captured image using the scene-based lighting feature. In this case, in the training method, the network parameters of the encoding network, the decoding network, the light source color prediction network, the decoupling network, and the second attention network may be adjusted by minimizing a loss calculated with the first loss function and the second loss function.

Also, considering that just training a model using the lighting information may not completely decouple the scene feature and the lighting feature, there is no guarantee that the scene hidden feature may represent scene-related information, and the lighting hidden feature may represent lighting-related information. In order to explore the representation capabilities of the scene hidden feature for various scene contents (e.g., a scene attribute, structure, texture, etc.), the method of one or more embodiments may train scene content representation using supervised training of two operations of scene generation and scene classification.

Figure 14:
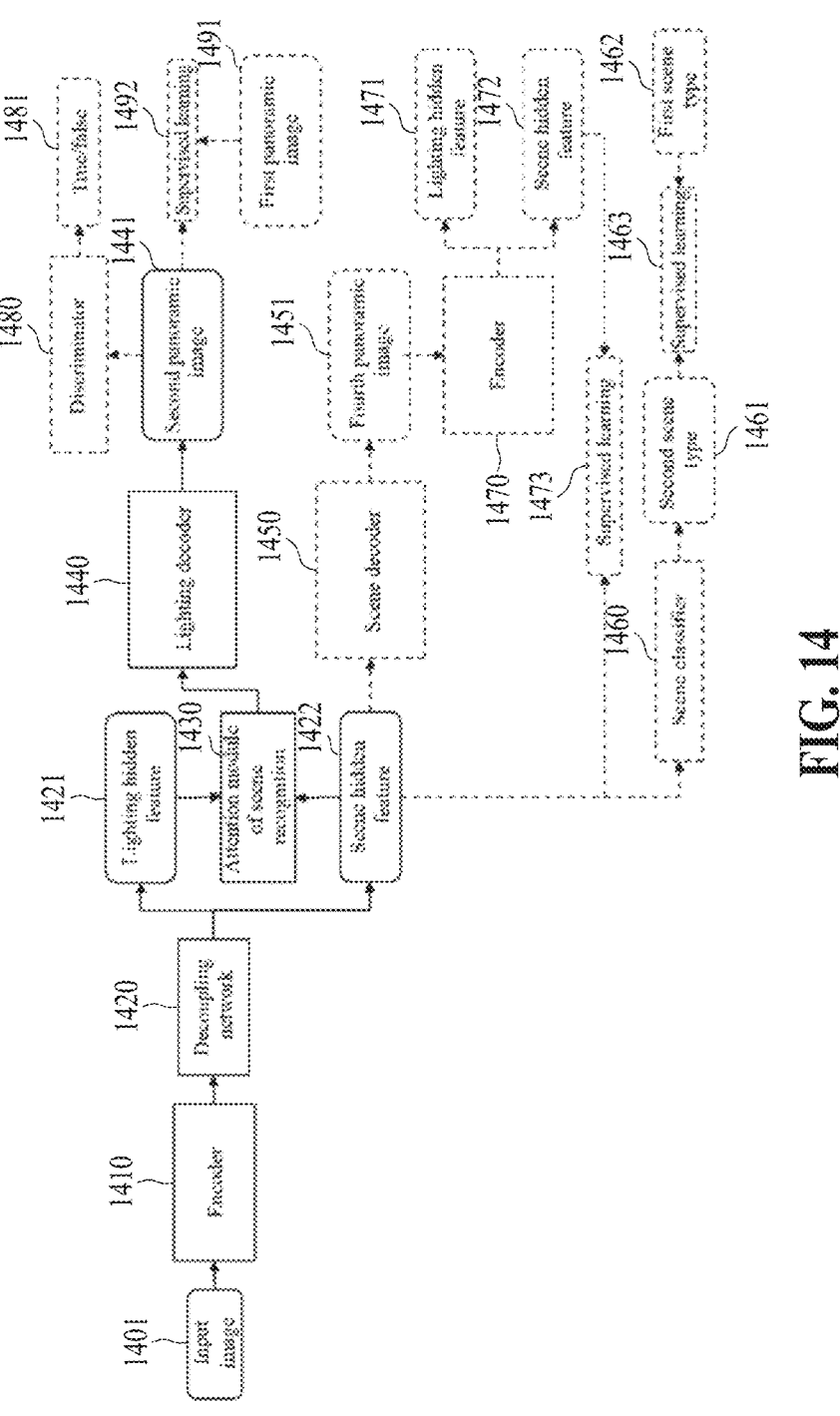
FIG. 14 illustrates an example of a method of training an image processing model.

FIG. 14 illustrates an example of a method of training an image processing model.

The training method of the image processing model may introduce a neural network-based scene decoder (also referred to as a scene decoding network) and a scene classifier (also referred to as a scene classification network).

For example, in the training method, a first scene type and a third panoramic image corresponding to a limited view image may be obtained, a second scene type of the limited view image may be predicted based on a scene feature decoupled using the scene classifier, a fourth panoramic image of the limited view image may be obtained by decoding the scene feature using the scene decoder, and network parameters of the image processing model may be adjusted based on the first scene type, the second scene type, the third panoramic image, the fourth panoramic image, the first light source color information, the second light source color information, the first panoramic image, and the second panoramic image.

Referring to FIG. 14, when an input image 1401 is received, an encoder 1410 obtains a global image feature by encoding the input image. At this time, the input image 1401 is data included in training data.

When the global image feature is received, a decoupling network 1420 obtains a lighting hidden feature 1421 and a scene hidden feature 1422 through a decoupling operation.

An attention module 1430 (which may also be referred to as a second attention network) of scene recognition may obtain a lighting feature of scene guidance by applying an attention mechanism to the scene hidden feature 1422 representing a scene content and the lighting hidden feature 1421. A light decoder 1440 outputs a panoramic image 1441, which is an HDR panoramic image, based on the lighting feature of the scene guidance.

A scene classifier 1460 receives the scene hidden feature 1422 to generate a second scene type 1461, and a scene decoder 1450 receives the scene hidden feature 1422 to generate a fourth panoramic image 1451 (which may be referred to as a complete scene panoramic image which is an image used to display scene information). At this time, the second scene type 1461 may be indoor or outdoor scene, or further classified into a scene of a library, office, park, or street.

For example, the operations of the scene decoder 1450 and the scene classifier 1460 may be used only for the learning of the ability of representing a scene content, and therefore, the operations may be used only in the model training and are not required for model inference. At the same time, for the scene decoder 1450 and the scene classifier 1460, network parameters of the scene decoder 1450 and the scene classifier 1460 may be fixed during the model training to optimize the training for the scene hidden feature 1422. As shown in FIG. 14, in supervised learning 1463 for the scene classification, the training may be performed using a fully supervised method, and in supervised learning 1473 for the scene generation, the training may be performed with scene hidden feature 1472 using a self-supervised method.

In the training method, an encoder 1470 may code the fourth panoramic image through the encoder 1470, and obtain lighting hidden feature 1471 and the scene hidden feature 1472 through a decoupling operation.

The supervised learning 1473 with the self-supervised method limits the scene hidden feature 1472 generated by the fourth panoramic image and the scene hidden feature 1422 generated by the input image 1401 to be as similar as possible.

When the supervised learning 1473 and the supervised learning 1463 are mainly performed for the learning of a content of a scene, it may be advantageous to confirm that the scene classifier 1460 is able to classify different types of scenes and the scene decoder 1450 is able to reconstruct the scene for an input feature. Therefore, the present disclosure proposes a method of using the scene decoder 1450 and the scene classifier 1460, allowing the use of the scene decoder 1450 and the scene classifier 1460 of fixed parameters in the training method of the image processing model.

Figure 15:
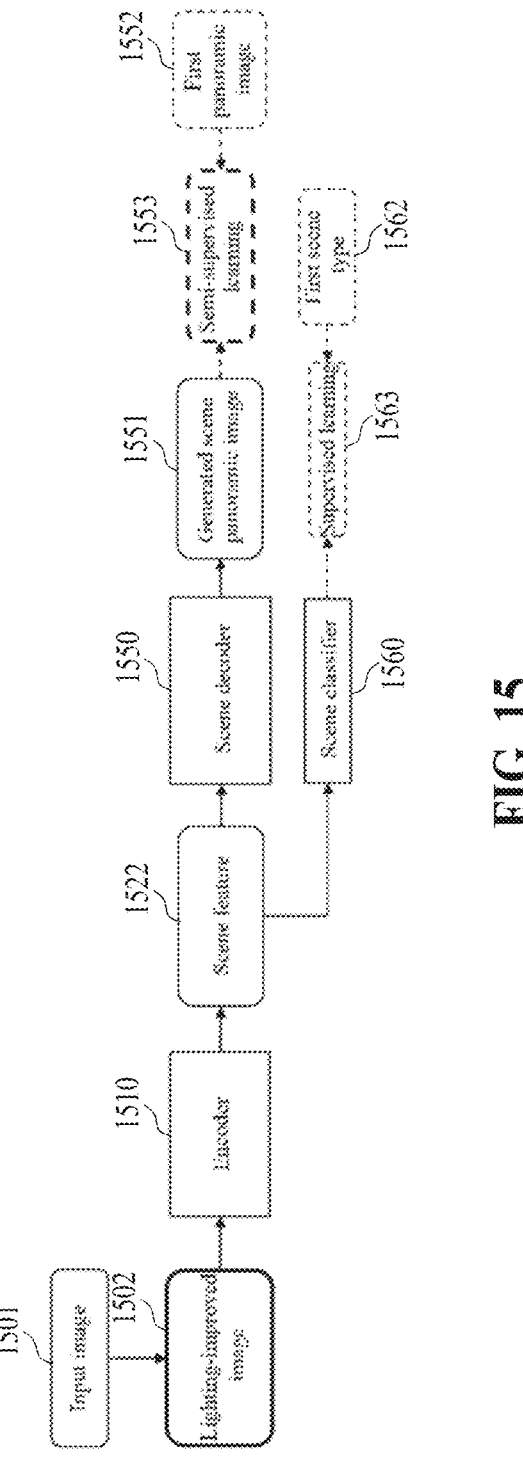
FIG. 15 illustrates an example of a method of training a scene decoder and a scene classifier.

FIG. 15 illustrates an example of a method of training a scene decoder and a scene classifier.

Referring to FIG. 15, an input image 1501 may be an incomplete color image of a scene. In the training method, a lighting may be improved for the input image 1501 to obtain a lighting-improved image 1502. In the training method, to obtain invariability of a model with respect to other lighting, a scene feature 1522 may be obtained from the lighting-improved image 1502 through an encoder 1510. A scene decoder 1550 may generate a scene panoramic image 1551 using the scene feature 1522. A scene classifier 1560 may obtain a scene type using the scene feature 1522.

In the training method, semi-supervised learning 1553 may be performed based on the generated scene panoramic image 1551 and a first panoramic image 1552 which is an actual panoramic image. In the training method, supervised learning 1563 may be performed using a fully supervised method based on the scene type generated through the scene classifier 1560 and a first scene type 1562 which is an actual scene type. In the training method, when the trained scene decoder 1550 and scene classifier 1560 are obtained, these may be applied to the training of the image processing model of FIG. 14. That is, the scene decoder 1450 and the scene classifier 1460 of FIG. 14 may be replaced with the trained scene decoder 1550 and the scene classifier 1560.

Returning to the description with reference to FIG. 14, the network parameters of the scene decoder 1450 and the scene classifier 1460 may be fixed during the training process of the image processing model such that the scene hidden feature 1472 may be optimized and learned in a more excellent manner.

In addition, supervised learning 1492 may be performed with the training of the image processing model, the second panoramic image 1441 which is the predicted HDR panoramic image and a first panoramic image 1491 which is an actual panoramic image to adjust the network parameters. In addition, in the training method, a discriminator 1480 may determine whether the second panoramic image 1441 is an actual image or a false image in operation 1481, and further adjust the network parameters to make the second panoramic image 1441 more realistic.

When the training is performed using the discriminator 1480, the light decoder 1440 may generate the second panoramic image 1441 that looks realistic. When the training is performed using the scene decoder 1450 and the scene classifier 1460, the scene hidden feature 1472 may have a rich scene content, and this is used to guide the encoder 1470 to generalize lighting estimation of various scene types.

FIG. 16 illustrates an example of a structure of an image processing apparatus in a hardware operating environment.

Here, an image processing apparatus 1600 may implement the image processing function and model training function.

As shown in FIG. 16, the image processing apparatus 1600 may include a processing component 1601 (e.g., one or more processing components), a communication bus 1602, a network interface 1603, an input and output interface 1604, a memory 1605 (e.g., one or more memories), and a power component 1606. Among them, the communication bus 1602 may be used to connect communication numbers between these components. In addition, the input and output interface 1604 may include a video display (e.g., a liquid crystal display (LCD)), a microphone, a speaker, and a user interaction interface (e.g., a keyboard, a mouse, or a touch input device). The input and output interface 1604 may selectively include a standard wired interface or a wireless interface. The network interface 1603 may selectively include a standard wired interface and a wireless interface (e.g., a Wi-Fi interface). The memory 1605 may be highspeed random access memory (RAM) or a stable non-volatile memory. Optionally, the memory 1605 may be a storage device independent of the processing component 1601. For example, the memory 1605 may be or include a non-transitory computer-readable storage medium storing instructions that, when executed by the processing component 1601, configure the processing component 1601 to perform any one, any combination, or all of operations and/or methods disclosed herein with reference to FIGS. 1-16.

Those skilled in the art may understand that the structure shown in FIG. 16 does not limit the structure of the image processing apparatus 1600, may include more or less components than shown in the drawing, or may include a combination of specific components or arrangement of other components.

As shown in FIG. 16, the memory 1605 as a storage medium may include an operating system (OS) such as a MAC OS, a data storage module, a network communication module, a user interface module, and a program and a database related to the image processing method and the model training method.

In the image processing apparatus 1600 shown in FIG. 16, the network interface 1603 may be mainly used for data communication with an external device/terminal, and the input and output interface 1604 may be mainly used for data interaction with a user. The processing component 1601 and the memory 1605 of the image processing apparatus 1600 may be set in the image processing apparatus 1600. The image processing apparatus 1600 may call various application programming interfaces (APIs) provided by the program and OS stored in the memory 1605 for implementing the image processing method and the model training method of the present disclosure through the processing component 1601 to implement the image processing method and the model training method provided in an example of the present disclosure.

The processing component 1601 may include at least one processor, and the memory 1605 stores a computer-executable instruction set. When the computer-executable instruction set is executed by the at least one processor, the image processing method and the model training method according to an example of the present disclosure may be performed. In addition, the processing component 1601 may perform the image processing process or the model training process. However, the above example is merely an example and is not limited thereto.

For example, the image processing apparatus 1600 may be a personal computer (PC), a tablet device, a personal digital assistant (PDA), a smartphone, or other devices for executing the aforementioned instruction set. Here, the image processing apparatus 1600 may not need to be a single electronic device, and may be any device or assembly of a circuit configured to execute the above instructions (or the instruction set) alone or jointly. The image processing apparatus 1600 may also be a part of an integrated control system or a system administrator, or may be configured as a portable electronic device for interfacing in a local or remote manner (e.g., via wireless transmission).

In the image processing apparatus 1600, the processing component 1601 may include a central processing unit (CPU), a graphics processing unit (GPU), a programmable logic device, a dedicated processor system, a microcontroller, or a microprocessor. In addition, the processing component 1601 may further include, for example, but is not limited to, an analog processor, a digital processor, a microprocessor, a multicore processor, a processor array, or a network processor.

The processing component 1601 may execute an instruction or code stored in a memory, and the memory 1605 may further store data. Instructions and data may also be transmitted and received over a network via the network interface device 1603 that may use a known transport protocol.

The memory 1605 may be integrated with a processor as a RAM or a flash memory arranged in an integrated circuit microprocessor. The memory 1605 may include an independent device such as an external disk drive, a storage array, or other storage devices that may be used by any database system. The memory and the processor may be operatively coupled or communicate with each other through an I/O port, network connection, etc., allowing the processor to read files stored in the memory.

According to an example of the present disclosure, an electronic device may be provided.

FIG. 17 illustrates an example of an electronic device.

An electronic device 1700 may include a memory 1702 (e.g., one or more memories) and a processor 1701 (e.g., one or more processors). The memory 1702 may store a computer-executable instruction set, and perform the image processing method and the model training method according to an example of the present disclosure, when the computer-executable instruction set is executed by the processor 1701. For example, the memory 1702 may be or include a non-transitory computer-readable storage medium storing instructions that, when executed by the processor 1701, configure the processor 1701 to perform any one, any combination, or all of operations and/or methods disclosed herein with reference to FIGS. 1-16.

The processor 1701 may include a CPU, a GPU, a programmable logic device, a dedicated processor system, a microcontroller, or a microprocessor. In addition, the processor 1701 may include, for example, but is not limited to, an analog processor, a digital processor, a microprocessor, a multicore processor, a processor array, or a network processor.

The memory 1702a storage medium and may include an OS (e.g., MAC OS), a data storage module, a network communication module, a user interface module, a recommendation module, and a database.

The memory 1702 may be integrated with the processor 1701. For example, a RAM or flash memory may be arranged in an integrated circuit microprocessor. The memory 1702 may also include a separate device such as an external disk drive, a storage array, or other storage devices that may be used by any database system. The memory 1702 and the processor 1701 may be operatively coupled or communicate with each other through an I/O port, network connection, etc., allowing the processor 1701 to read files stored in the memory 1702.

In addition, the electronic device 1700 may further include a video display (e.g., a liquid crystal display (LCD)) and a user interaction interface (e.g., a keyboard, a mouse, or a touch input device). All components of the electronic device 1700 may be connected to each other through a bus and/or a network.

For example, the electronic device 1700 may be a PC, a tablet device, a PDA, a smartphone, or other devices configured to execute the above instruction set. Here, the electronic device 1700 may not need to be a single electronic device, and may be any device or assembly of a circuit configured to execute the above instructions (or the instruction set) alone or jointly. The electronic device 1700 may also be a part of an integrated control system or a system administrator, or may be configured as a portable electronic device for interfacing in a local or remote manner (e.g., via wireless transmission).

Those skilled in the art will understand that the structure shown in FIG. 17 does not limit the structure, may include more or less components than shown in the drawing, or may include a combination of specific components or arrangement of other components.

At least one module among the plurality of modules may be implemented through an artificial intelligence (AI) model. AI-related functions may be performed by a non-volatile memory, a volatile memory, and a processor.

The processor may include one or more processors. The one or more processors may be, for example, general-purpose processors (e.g., a CPU and an application processor (AP), etc.), or graphics-dedicated processors (e.g., a GPU and a vision processing unit (VPU)), and/or AI-dedicated processors (e.g., a neural processing unit (NPU)).

The one or more processors may control processing of input data according to a predefined operation rule or an AI model stored in a non-volatile memory and a volatile memory. The predefined operation rules or AI model may be provided through training or learning. Here, providing the predefined operation rules or AI model through learning may indicate obtaining a predefined operation rule or AI model with desired characteristics by applying a learning algorithm to a plurality of pieces of training data. The training may be performed by a device having an AI function according to the disclosure, or by a separate server/device/system.

The learning algorithm may be a method of training a predetermined target device, for example, a robot, based on a plurality of pieces of training data and of enabling, allowing or controlling the target device to perform determination or prediction. The learning algorithm may include, but is not limited to, for example, supervised learning, unsupervised learning, semi-supervised learning, or reinforcement learning.

According to the present disclosure, in an image processing method performed in the electronic device, an output image may be obtained in response to processing a target area using an input image as input data for an AI model.

The AI model may be obtained through training. Here, "being obtained through training" refers to training predefined operating rules or an AI model configured to perform a necessary feature (or objective) by training a basic AI model with a plurality of pieces of training data through a training algorithm.

For example, the AI model may be configured with a plurality of neural network layers. Each layer has a plurality of weights, and the calculation of one layer may be performed based on a calculation result of a previous layer and the plurality of weights of the current layer. A neural network may include, for example, a CNN, a deep neural network (DNN), a recurrent neural network (RNN), a restricted Boltzmann machine (RBM), a deep belief network (DBN), a bidirectional recurrent deep neural network (BRDNN), a generative adversarial network (GAN), and a deep Q network, but is not limited thereto.

The encoders, decoders, light source color predictors, predictors, image block-based light source color predictors, CG rendering engines, OST MR devices, VST MR devices, light decoders, scene decoders, image processing apparatuses, processing components, communication buses, network interfaces, input and output interfaces, memories, power components, electronic devices, processors, encoder 210, decoder 220, light source color predictor 230, predictor

330, encoder 410, decoder 420, light source color predictor 430, encoder 510, decoder 520, light source color predictor 530, encoder 610, decoder 640, image block-based light source color predictor 710, CG rendering engine 920, OST MR device 1010, VST MR device 1020, CG rendering engine 1120, encoder 1410, light decoder 1440, scene decoder 1450, encoder 1470, encoder 1510, scene decoder 1550, image processing apparatus 1600, processing component 1601, communication bus 1602, network interface 1603, input and output interface 1604, memory 1605, power component 1606, electronic device 1700, memory 1702, processor 1701, and other apparatuses, devices, units, modules, and components disclosed and described herein with respect to FIGS. 1-17 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-17 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method comprising:
obtaining an input image;
predicting light source color information of a scene corresponding to the input image and predicting a panoramic image corresponding to the input image using an image processing model; and
generating a rendered image by rendering the input image based on either one or both of the light source color information and the panoramic image.

2. The method of claim 1, wherein the predicting of the light source color information of the scene corresponding to the input image and the panoramic image corresponding to the input image using the image processing model comprises:
generating an encoded feature of the input image by encoding the input image using an encoding network of the image processing model; and
predicting the light source color information and the panoramic image based on the encoded feature using a first prediction network of the image processing model.

3. The method of claim 2, wherein the generating of the encoded feature of the input image by encoding the input image using the encoding network of the image processing model comprises:
obtaining a plurality of image blocks by dividing the input image;
generating encoded features of the plurality of image blocks by encoding each of the plurality of image blocks; and
generating an encoded feature of the input image based on the encoded features of the plurality of image blocks.

4. The method of claim 3, wherein the generating of the encoded features of the plurality of image blocks by encoding each of the plurality of image blocks comprises:
generating an initial encoded feature of each image block by encoding each of the plurality of image blocks; and
improving a feature of the initial encoded feature of each image block using a first attention network of the image processing model to generate the improved encoded feature of each image block as encoded features of the plurality of image blocks.

5. The method of claim 3, wherein the predicting of the light source color information comprises:

for each image block, predicting light source color information of a scene corresponding to the image block based on the encoded feature of the image block, and determining a reliability of the image block; and obtaining the light source color information of the scene by pooling the light source color information corresponding to the image block based on the reliability of each image block.

6. The method of claim 3, wherein the predicting of the panoramic image comprises:

obtaining a reliability of each image block;

obtaining a high dynamic range (HDR) image corresponding to each image block by decoding each of the encoded feature of each image block; and generating the panoramic image by pooling the HDR image corresponding to the image block based on the reliability of each image block.

7. The method of claim 2, wherein the generating of the encoded feature of the input image by encoding the input image using the encoding network of the image processing model comprises:

generating a global feature of the input image by encoding the input image using the encoding network;

generating a lighting feature and a scene feature by decoupling features from the global feature using a decoupling network of the image processing model; and improving features of the lighting feature and the scene feature using a second attention network of the image processing model to generate a scene-based lighting feature as the encoded feature of the input image.

8. The method of claim 1, wherein the predicting of the light source color information of the scene corresponding to the input image and the panoramic image corresponding to the input image using the image processing model comprises:

generating an encoded feature of the input image by encoding the input image using an encoding network of the image processing model;

predicting the light source color information based on the encoded feature using a second prediction network of the image processing model; and predicting the panoramic image by decoding the encoded feature using a decoding network of the image processing model.

9. The method of claim 1, wherein the generating of the rendered image by rendering the input image based on either one or both of the light source color information and the panoramic image comprises:

generating the rendered image by rendering the input image based on the input image, the panoramic image, and virtual object related information; and outputting the rendered image using a video see through (VST) device.

10. The method of claim 1, wherein the generating of the rendered image by rendering the input image based on either one or both of the light source color information and the panoramic image comprises:

generating a panoramic image corresponding to a white light source by performing color correction on the panoramic image based on the light source color information using a white balance method;

generating a first rendered image by rendering the input image based on the panoramic image of the white light source and virtual object related information;

generating actual light source color information of the scene by mapping the light source color information;

generating a second rendered image by adjusting a color of the first rendered image using the actual light source color information; and outputting a target image formed by superposing the input image and the second rendered image using an optical see through (OST) device.

11. The method of claim 10, wherein the target image is formed by superposing the input image and a prime number of the second rendered images.

12. The method of claim 1, further comprising predicting camera parameters related to capturing of the input image using the image processing model.

13. The method of claim 1, further comprising:

obtaining training data, wherein the training data comprises a limited view image with a different field of view under a same scene, a first panoramic image, and first light source color information corresponding to when the limited view image and the first panoramic image are captured;

predicting second light source color information of a scene corresponding to the limited view image and a second panoramic image corresponding to the limited view image using the image processing model; and training the image processing model by adjusting network parameters of the image processing model based on the first light source color information, the second light source color information, the first panoramic image, and the second panoramic image.

14. An electronic device comprising:

one or more processors configured to:

obtain an input image;

predict light source color information of a scene corresponding to the input image and predict a panoramic image corresponding to the input image using an image processing model; and generate a rendered image by rendering the input image based on either one or both of the light source color information and the panoramic image.

15. The electronic device of claim 14, wherein, for the predicting of the light source color information and the panoramic image, the one or more processors are configured to:

generate an encoded feature of the input image by encoding the input image using an encoding network of the image processing model; and predict the light source color information and the panoramic image based on the encoded feature using a first prediction network of the image processing model.

16. The electronic device of claim 14, wherein, for the predicting of the light source color information and the panoramic image, the one or more processors are configured to:

generate an encoded feature of the input image by encoding the input image using an encoding network of the image processing model;

predict the light source color information based on the encoded feature using a second prediction network of the image processing model; and predict the panoramic image by decoding the encoded feature using a decoding network of the image processing model.

17. The electronic device of claim 14, wherein, for the generating of the rendered image, the one or more processors are configured to:

generate the rendered image by rendering the input image based on the input image, the panoramic image, and virtual object related information; and output the rendered image using a video see through (VST) device.

18. The electronic device of claim 14, wherein, for the generating of the rendered image, the one or more processors are configured to:

generate a panoramic image corresponding to a white light source by performing color correction on the panoramic image based on the light source color information using a white balance method;

generate a first rendered image by rendering the input image based on the panoramic image of the white light source and virtual object related information;

generate actual light source color information of the scene by mapping the light source color information;

generate a second rendered image by adjusting a color of the first rendered image using the actual light source color information; and output a target image formed by superposing the input image and the second rendered image using an optical see through (OST) device.

19. The electronic device of claim 14, wherein the one or more processors are configured to:

obtain training data comprising a limited view image with a different field of view under a same scene, a first panoramic image, and first light source color information corresponding to when the limited view image and the first panoramic image are captured;

predict second light source color information of a scene corresponding to the limited view image and a second panoramic image corresponding to the limited view image using the image processing model; and train the image processing model by adjusting network parameters of the image processing model based on the first light source color information, the second light source color information, the first panoramic image, and the second panoramic image.

20. A processor-implemented method comprising:

obtaining training data, wherein the training data comprises a limited view image with a different field of view under a same scene, a first panoramic image, and first light source color information corresponding to when the limited view image and the first panoramic image are captured;

predicting second light source color information of a scene corresponding to the limited view image and a second panoramic image corresponding to the limited view image using an image processing model; and training the image processing model by adjusting network parameters of the image processing model based on the first light source color information, the second light source color information, the first panoramic image, and the second panoramic image.

* * * * *